OPTICAL COMMUNICATION APPARATUS, OPTICAL COMMUNICATION METHOD, AND OPTICAL COMMUNICATION SYSTEM

(12) United States Patent
Irie et al.

(10) Patent No.: US 9,059,800 B2
(45) Date of Patent: Jun. 16, 2015

(54) OPTICAL COMMUNICATION APPARATUS, OPTICAL COMMUNICATION METHOD, AND OPTICAL COMMUNICATION SYSTEM

(75) Inventors: Yasuyuki Irie, Yokohama (JP); Makoto Chishima, Yokohama (JP); Keijiro Minami, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 1455 days.

(21) Appl. No.: 12/088,379

(22) PCT Filed: Sep. 13, 2006

(86) PCT No.: PCT/JP2006/318118
§ 371 (c)(1),
(2), (4) Date: Nov. 12, 2008

(87) PCT Pub. No.: WO2007/037122
PCT Pub. Date: Apr. 5, 2007

(65) Prior Publication Data
US 2009/0129781 A1    May 21, 2009

(30) Foreign Application Priority Data
Sep. 27, 2005  (JP) .................................. 2005-280974

(51) Int. Cl.
*H04B 10/114*    (2013.01)
*H04B 10/116*    (2013.01)
*H04B 10/112*    (2013.01)

(52) U.S. Cl.
CPC .......... *H04B 10/116* (2013.01); *H04B 10/1125* (2013.01); *H04B 10/1149* (2013.01)

(58) Field of Classification Search
CPC . H04B 10/1149; H04B 10/116; H04B 10/695
USPC .......................................... 398/130, 172, 202
See application file for complete search history.

(56) References Cited

U.S. PATENT DOCUMENTS 5,801,860 A * 9/1998 Yoneyama ...................... 398/94
6,215,567 B1 * 4/2001 Tochio .............................. 398/9
(Continued)

FOREIGN PATENT DOCUMENTS

JP  2000-049712    2/2000
JP  2000-261380    9/2000
(Continued)

OTHER PUBLICATIONS

"What is visible light communication" (Japanese), Visible light communications consortium, [retrieved on Sep. 7, Heisei 16 (2004), URL <http://www.vlcc.net/about.html>.
(Continued)

*Primary Examiner* — Tod T Van Roy
(74) *Attorney, Agent, or Firm* — Procopio, Cory, Hargreaves & Savitch LLP

(57) ABSTRACT

Optical communication apparatuses capable of performing appropriate communication according to a distance to a receiving apparatus, optical communication methods, and an optical communication system are provided. A transmitting apparatus transmits an optical signal corresponding to data. The transmitting apparatus modulates intensity of the optical signal into intensity corresponding to a distance over which the data is to be delivered and outputs this intensity-modulated optical signal. This allows the transmitting apparatus to change the intensity of the optical signal corresponding to the data according to a distance to a receiving apparatus that receives the data, which thus allows the receiving apparatus to surely receive the data.

26 Claims, 18 Drawing Sheets

(56) References Cited

U.S. PATENT DOCUMENTS

| | | |
|---|---|---|
| 6,623,187 B1 | 9/2003 | Mihota |
| 7,016,612 B1 | 3/2006 | Ikeda et al. |
| 7,099,589 B1 * | 8/2006 | Hiramatsu .................... 398/127 |
| 7,116,422 B2 * | 10/2006 | Larking et al. ................ 356/437 |
| 7,548,736 B2 * | 6/2009 | Sakai et al. ................. 455/151.2 |
| 2001/0006428 A1 | 7/2001 | Mizuno |
| 2002/0167701 A1 | 11/2002 | Hirata |

FOREIGN PATENT DOCUMENTS

| | | |
|---|---|---|
| JP | 2001-186088 | 7/2001 |
| JP | 2004-072365 | 3/2004 |
| JP | 2002-290355 | 10/2004 |
| JP | 2004-297425 | 10/2004 |

OTHER PUBLICATIONS

"What is visible light communication" (English Translation), 2004.

* cited by examiner

OPTICAL COMMUNICATION APPARATUS, OPTICAL COMMUNICATION METHOD, AND OPTICAL COMMUNICATION SYSTEM

CROSS-REFERENCE TO RELATED APPLICATION

This application is the U.S. national stage application of international application serial number PCT/JP2006/318118, filed 13 Sep. 2006, which claims priority to Japanese patent application no. 2005-280974, filed 27 Sep. 2005, each of which is incorporated herein by reference in its entirety.

FIELD OF INVENTION

Technical Field

The present invention relates to optical communication apparatuses, optical communication methods, and optical communication systems. In particular, the present invention relates to a technology for performing optical communication using visible light and for utilizing the visible light as illuminating light.

BACKGROUND OF THE INVENTION

Background Art

Recently, optical communication using infrared radiation or visible light has started to be utilized. The infrared communication, among these, has a problem that an improvement in the communication speed is limited since transmission at a high power level cannot be carried out from a standpoint of eye safety (protection of eyes). On the other hand, since a visible light element, such as a color-variable LED (Light Emitting Diode), is used as a light source, the visible light communication solves the aforementioned problem of the infrared communication and has an advantage that data can be transmitted utilizing the characteristic that the visible light element blinks at high speed (see, "What is visible light communication?", Visible light communications consortium, retrieved Sep. 7, 2004, URL <http://www.vlcc.net/about.html>).

Such a visible light element can be used not only in optical communications but also as illuminating light. For example, an apparatus described in Japanese Unexamined Patent Application Publication No. 2002-290335 illuminates with white light by mixing colors using three kinds of LED for emitting light in three primary colors of light, which are red (R), green (G), and blue (B), and also superposes separate data on each LED to carry out multiplex color communication.

In this case, light intensity used in the communication through the visible light element is required to sufficiently satisfy light intensity of illuminating light. For example, an apparatus described in Japanese Unexamined Patent Application Publication No. 2004-72365 causes an LED to emit light on the basis of inverted-pulse position modulation that inverts on-off positions of a pulse signal sequence that causes light to be emitted (on) in a pulse-on period and causes the light not to be emitted (off) in a pulse-off period, thereby extending on-periods of pulses to improve luminous intensity of illumination and performing communications.

DISCLOSURE OF INVENTION

Problems to be Solved by the Invention

In a case where a light source emits visible light signals at predetermined intensity, a receiving device can receive sufficient intensity of light if a distance between the receiving device and the light source is close. Accordingly, an accurate signal can be received, less redundant components necessary for error correction and re-transmission are needed, and high-throughput communication can be carried out. However, since the intensity drops and other kinds of light are received as noise components when the receiving device is away from the light source, the receiving device cannot receive data unless the receiving device fully considers the redundant components and the re-transmission. Accordingly, as the distance between the receiving device and the light source becomes farther, the throughput decreases.

In such a case, if the redundant components and the re-transmission are increased for a receiving device located at a distance farther than the light source, a receiving device located at a short distance can receive a less amount of information although it can perform high throughput communication. On the other hand, if the redundant components are reduced for the receiving device at the short distance, a receiving device at a long distance may be incapable of receiving data at all.

The present invention is made to solve the above-described problems. It is an object of the present invention to provide optical communication apparatuses capable of performing appropriate communication according to a distance to a receiving apparatus, optical communication methods, and an optical communication system including them.

Means for Solving the Problems

Against the above-described problems, according to one aspect of the present invention, an optical communication apparatus for transmitting an optical signal corresponding to data includes an intensity modulating section for modulating the optical signal into intensity corresponding to a distance over which the data is to be delivered, and an output section for outputting the optical signal whose intensity is modulated by the intensity modulating section.

According to this configuration, since an optical signal corresponding to data is modulated into intensity corresponding to a distance over which the data is to be delivered and then the modulated optical signal is output, it is possible to surely deliver the data to a receiving apparatus. Additionally, according to another aspect of the present invention, the intensity modulating section changes intensity of the optical signal for each wavelength of the optical signal. With this configuration, optical signals having wavelengths different according to distances over which data is to be delivered is output.

In addition, according to further aspect of the present invention, the intensity modulating section changes intensity of the optical signal for each time slot, corresponding to the optical signal, in time-division multiplexing. With this configuration, an optical signal, having different intensity corresponding to a distance over which data is to be delivered, that corresponds to each time slot is output. Furthermore, according to further aspect of the present invention, the output section varies the time slot according to intensity of the optical signal to be output. This configuration prevents a waveform of an optical signal from being distorted.

Similarly, according to further aspect of the present invention, if an intensity difference is equal to or greater than a predetermined value when intensity of the optical signals to be consecutively output changes from a high level to a low level, the output section outputs the low level optical signal after a predetermined time since output of the high level optical signal. Similarly, according to further aspect of the present invention, if an intensity difference of the optical signals to be consecutively output is equal to or greater than a predetermined value, the output section switches an output order to make the intensity difference less than the predetermined value. In addition, according to further aspect of the present invention, the output section emits an optical signal having a wavelength in a visible light region. Additionally, according to further aspect of the present invention, the output section is an illuminating apparatus. Furthermore, according to further aspect of the present invention, the output section superposes an optical signal whose intensity is modulated by the intensity modulating section on illuminating light to output the optical signal.

Additionally, according to further aspect of the present invention, the output section is a display apparatus. In addition, according to further aspect of the present invention, the output section superposes an optical signal whose intensity is modulated by the intensity modulating section on light of an image to output the optical signal. Furthermore, according to further aspect of the present invention, the data is attached with information for identifying a distance over which the data is to be delivered, and the intensity modulating section modulates the optical signal into intensity corresponding to a distance over which the data is to be delivered on the basis of the information for identifying the distance.

Additionally, according to further aspect of the present invention, the output section has a light-emitting diode as a light source. In addition, according to further aspect of the present invention, an optical communication apparatus for transmitting an optical signal corresponding to data, includes a light receiving section for receiving an optical signal whose intensity is modulated according to a distance over which the data is to be delivered, and an analyzing section for analyzing the optical signal received by the light receiving section and acquiring the data on the basis of the analysis result. With this configuration, it is possible to receive an optical signal from the above-described optical communication apparatus and to acquire data.

Additionally, according to further aspect of the present invention, the light receiving section receives an optical signal whose intensity is changed for each wavelength, and the analyzing section analyzes, for each wavelength, the optical signal received by the light receiving section. In addition, according to further aspect of the present invention, the light receiving section receives an optical signal whose intensity is changed for each time slot in time-division multiplexing, and the analyzing section analyzes, for each time slot, the optical signal received by the light receiving section. Additionally, according to further aspect of the present invention, the light receiving section receives an optical signal having a wavelength in a visible light region.

Furthermore, according to further aspect of the present invention, the light receiving section receives illuminating light on which an optical signal whose intensity is modulated according to a data-delivering distance is superposed, and the analyzing section extracts the optical signal from the illuminating light received by the light receiving section and analyzes the optical signal. Moreover, according to further aspect of the present invention, the light receiving section receives light of an image on which an optical signal whose intensity is modulated according to a data-delivering distance is superposed, and the analyzing section extracts the optical signal from the light of the image received by the light receiving section and analyzes the optical signal.

In addition, according to further aspect of the present invention, an image displaying section for performing displaying of an image utilizing the data on the basis of screen configuration data attached to the data acquired by the analyzing section is further included. Additionally, according to further aspect of the present invention, an optical communication method for transmitting an optical signal corresponding to data includes an intensity modulating step of modulating the optical signal into intensity corresponding to a distance over which the data is to be delivered, and an outputting step of outputting the optical signal whose intensity is modulated at the intensity modulating step.

Furthermore, according to further aspect of the present invention, intensity of the optical signal is changed for each wavelength of the optical signal at the intensity modulating step. Moreover, according to further aspect of the present invention, intensity of the optical signal is changed for each time slot, corresponding to the optical signal, in time-division multiplexing at the intensity modulating step. Additionally, according to further aspect of the present invention, the time slot is varied at the outputting step according to intensity of the optical signal to be output.

In addition, according to further aspect of the present invention, if an intensity difference is equal to or greater than a predetermined value when the intensity of the optical signals to be consecutively output changes from a high level to a low level, the low level optical signal is output after a predetermined time since output of the high level optical signal at the outputting step. Furthermore, according to further aspect of the present invention, if an intensity difference of the optical signals to be consecutively output is equal to or greater than a predetermined value, an output order is switched to make the intensity difference less than the predetermined value at the outputting step.

Moreover, according to further aspect of the present invention, an optical signal having a wavelength in a visible light region is emitted at the outputting step. Additionally, according to further aspect of the present invention, an optical signal whose intensity is modulated at the intensity modulating step is superposed on illuminating light and is output at the outputting step. In addition, according to further aspect of the present invention, an optical signal whose intensity is modulated at the intensity modulating step is superposed on light of an image and is output at the outputting step.

Furthermore, according to further aspect of the present invention, the data is attached with information for identifying a distance over which the data is to be delivered, and the optical signal is modulated into intensity corresponding to a data-delivering distance on the basis of the information for identifying the distance at the intensity modulating step. Moreover, according to further aspect of the present invention, an optical communication method for receiving an optical signal corresponding to data includes a light receiving step of receiving an optical signal whose intensity is modulated according to a distance over which the data is to be delivered, and an analyzing step of analyzing the optical signal received at the light receiving step and acquiring the data on the basis of the analysis result.

Additionally, according to further aspect of the present invention, an optical signal whose intensity is changed for each wavelength is received at the light receiving step, and the optical signal received at the light receiving step is analyzed for each wavelength at the analyzing step. In addition, according to further aspect of the present invention, an optical signal whose intensity is changed for each time slot in time-division multiplexing is received at the light receiving step, and the optical signal received at the light receiving step is analyzed for each time slot at the analyzing step.

Furthermore, according to further aspect of the present invention, an optical signal having a wavelength in a visible light region is received at the light receiving step. Moreover, according to further aspect of the present invention, illuminating light on which an optical signal whose intensity is modulated according to a data-delivering distance is superposed is received at the light receiving step, and the optical signal is extracted from the illuminating light received at the light receiving step and is analyzed at the analyzing step.

Additionally, according to further aspect of the present invention, light of an image on which an optical signal whose intensity is modulated according to a data-delivering distance is superposed is received at the light receiving step, and the optical signal is extracted from the light of the image received at the light receiving step and is analyzed at the analyzing step. In addition, according to further aspect of the present invention, an image displaying step of performing displaying of an image utilizing the data on the basis of screen configuration data attached to the data acquired at the analyzing step is included.

Advantages

According to according to one aspect of the present invention, since an optical signal corresponding to data is modulated into intensity corresponding to a distance over which the data is to be delivered and is output, it is possible to surely deliver the data to a receiving apparatus.

BEST MODES FOR CARRYING OUT THE INVENTION

The present invention relates to techniques for visible light communication and particularly suggests a technique for performing differentiation of information according to a distance.

Figure 1:
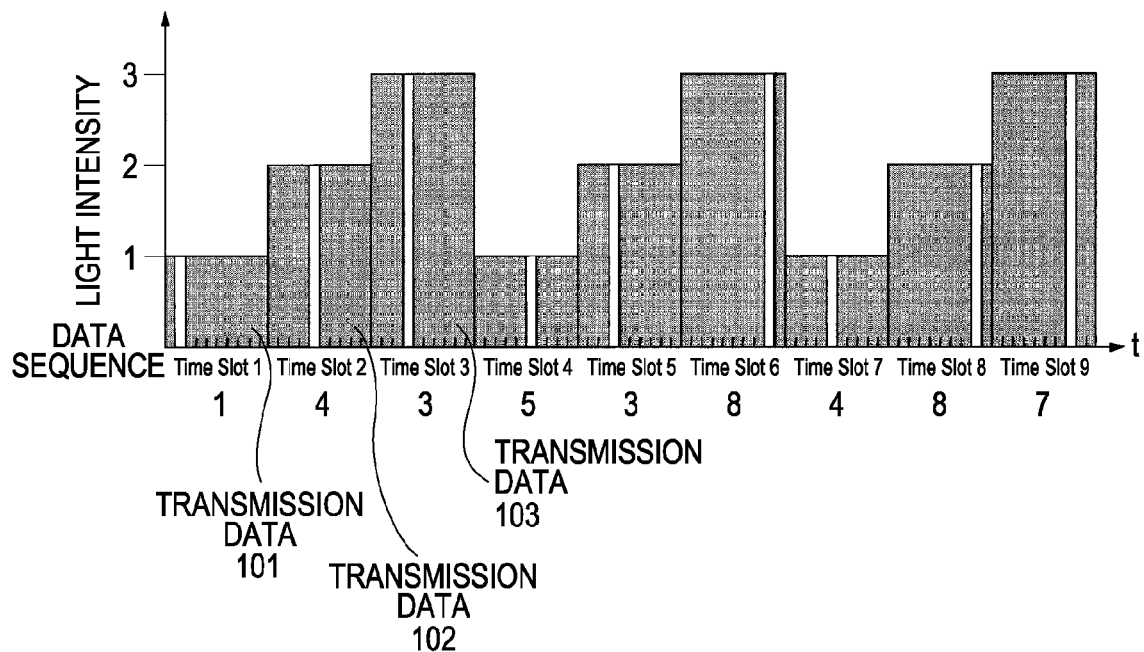
FIG. 1 is a diagram showing a first example of signals to be transmitted from a light source.
Figure 2:
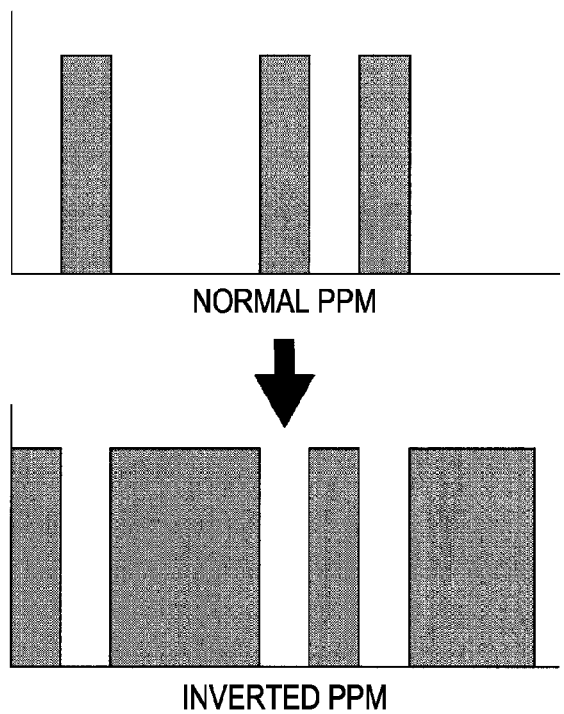
FIG. 2 is a diagram showing an example of modulation of inverted PPM.

FIG. 1 shows a first example of signals to be transmitted from a transmitting apparatus in a communication system according to the present invention. Here, it is assumed that the transmitting apparatus is an illuminating apparatus constituted by a single-color LED. It is also assumed that a method of inverted PPM (Inverted Pulse Position Modulation) shown in FIG. 2 is used as a signal modulation section.

Signals shown in FIG. 1 are an example of signals corresponding to three step distances. As shown in the drawing, in a case where a transmitting apparatus transmits transmission data 101 over a short distance, transmission data 102 over a medium distance, and transmission data 103 over a long distance, the transmission data 101 has light intensity 1, the transmission data 102 has light intensity 2 that is greater than the light intensity 1, and the transmission 103 has light intensity 3 that is greater than the light intensity 2. Regarding such a power-controlled signal (light), the transmitting apparatus transmits the transmission data 101 at a time slot 1, the transmission data 102 at a time slot 2, and the transmission data 103 at a time slot 3.

Thereafter, the transmitting apparatus periodically changes the light intensity to 1, 2, and 3 to perform time division. The inverted PPM method is applied to the signals shown in FIG. 1. A blotted portion and a gap portion of the drawing correspond to light-emission ON and light-emission OFF, respectively. This can realize differentiation of information according to a distance, which cannot be realized with constant light intensity.

Additionally, in the case of monochromatic light, when lights having different intensities are simultaneously emitted, a weaker (darker) light is buried in a stronger (brighter) light and a signal attached to the weaker light may not be distinguished. Accordingly, the transmitting apparatus performs time division according to the emitting light intensity to prevent the weaker signal from being buried.

Furthermore, by setting a time slot sufficiently small as described below, it is possible to reduce flicker and allow the transmitting apparatus to emit light without deteriorating a function as an illuminating apparatus. The response time of an LED is approximately 3 µs in a green LED kind having the longest response time. The response speed of a phototransistor, which can be considered as a light receiving element, is approximately 2-4 µs. Thus, the total response time when the light intensity shifts from a high level to a low level or when the light intensity shifts from the low level to the high level is approximately 10 µs. Human vision cannot sense blinks of light in such a short time. Accordingly, by setting the time slot to approximately 10 µs, it is possible to perform communication without spoiling a function as an illuminating apparatus. In addition, it is possible to reduce flickers by using means for setting an offset component to a minimum light intensity.

Additionally, a receiving apparatus located at a position where the transmission data 101 is receivable can receive all pieces of the transmission data 101, 102, and 103. A receiving apparatus located at a position where the transmission data 102 is receivable can receive the pieces of the transmission data 102 and 103. A receiving apparatus located at a position where the transmission data 103 is receivable can only receive the transmission data 103. Thus, receiving apparatuses located far from a transmitting apparatus can acquire only a little information, whereas receiving apparatus located near the transmitting apparatuses can acquire more information.

Figure 3:
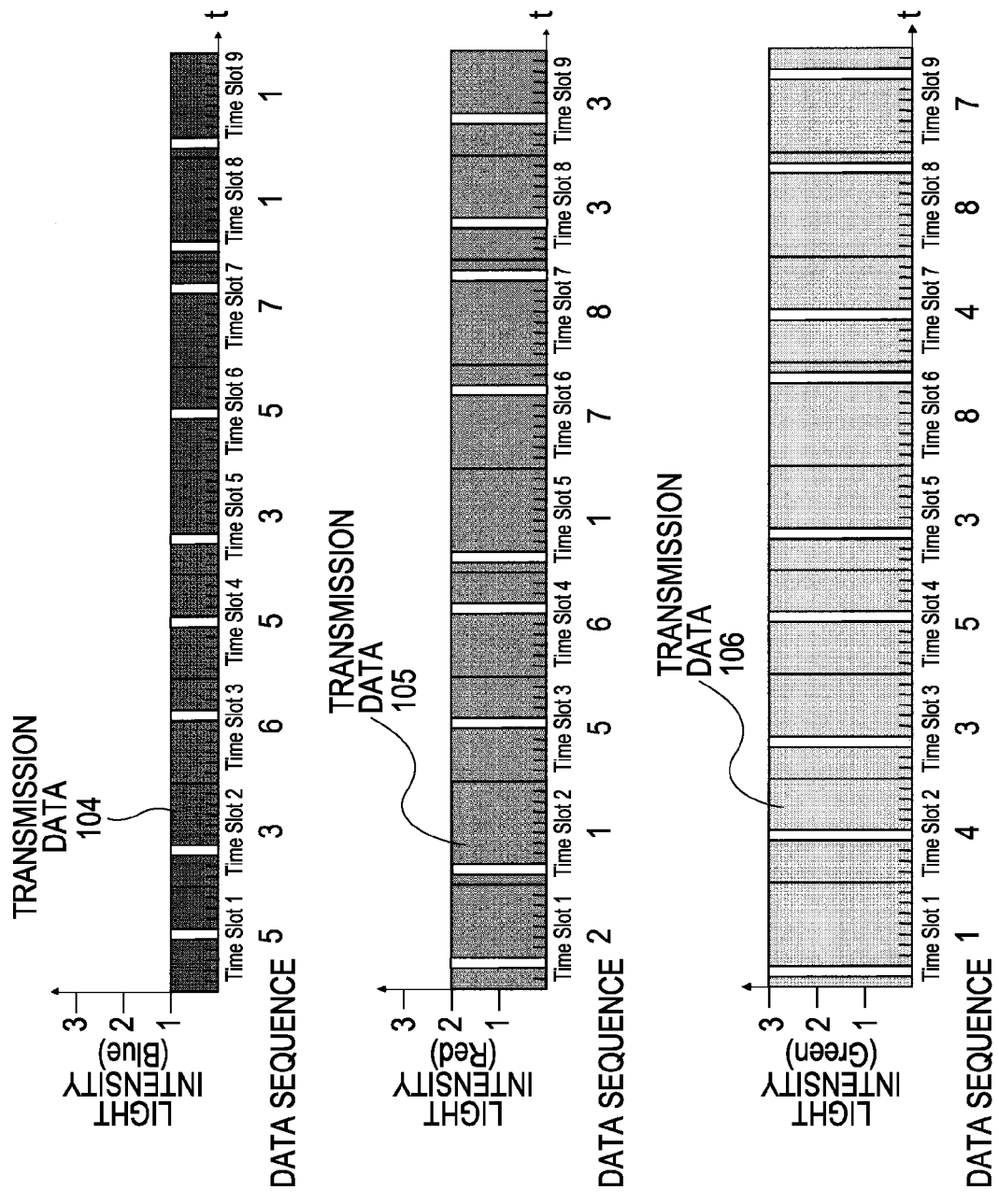
FIG. 3 is a diagram showing a second example of signals to be transmitted from a light source.

FIG. 3 shows a second example of signals to be transmitted from a transmitting apparatus in a communication system according to the present invention. Here, the transmitting apparatus is tri-color LEDs, for example, an illuminating apparatus that emits light in red (R), blue (B), and green (G). It is assumed that a method of inverted PPM is employed as a signal modulation section.

Signals shown in FIG. 3 are an example of signals corresponding to three step distances. As shown in the drawing, when the transmitting apparatus transmits transmission data 104 over a short distance, transmission data 105 over a medium distance, and transmission data 106 over a long distance, the blue LED, the red LED, and the green LED, among the RGB tri-color LEDs, transmit the transmission data 104, the transmission data 105, and the transmission data 106, respectively. Blue light is PPM-modulated and is emitted as the transmission data 104 at light intensity 1. Additionally, red light is PPM-modulated and is emitted as the transmission data 105 at light intensity 2, whereas green light is PPM modulated and is emitted as the transmission data 106 at light intensity 3. The inverted PPM method is applied to the signals shown in FIG. 3. A blotted portion and a gap portion of FIG. 3 correspond to light-emission ON and light-emission OFF, respectively. This can realize differentiation of information according to a distance, which cannot be realized with constant light intensity.

Figure 4:
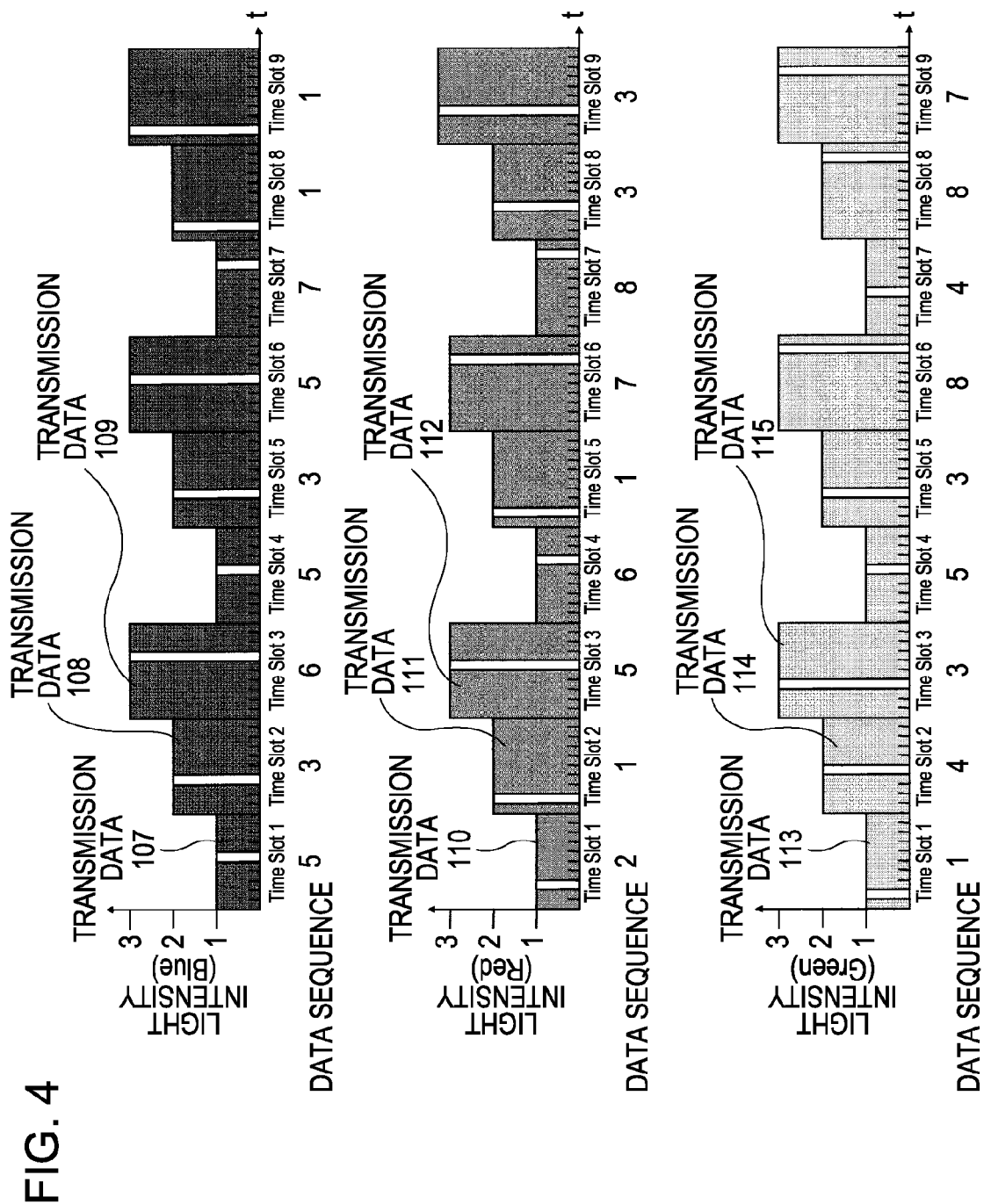
FIG. 4 is a diagram showing a third example of signals to be transmitted from a light source.

FIG. 4 shows a third example of signals to be transmitted from a transmitting apparatus in a communication system according to the present invention. Here, the transmitting apparatus is tri-color LEDs, for example, an illuminating apparatus that emits light in red (R), blue (B), and green (G). It is assumed that a method of inverted PPM is employed as a signal modulation section.

Signals shown in FIG. 4 are an example of signals corresponding to three step distances. As shown in the drawing, when the transmitting apparatus transmits pieces of transmission data 107, 110, and 113 over a short distance, a blue LED, a red LED, and a green LED transmit the transmission data 107, the transmission data 110, and the transmission data 113, respectively, at light intensity 1. In addition, when the transmitting apparatus transmits pieces of transmission data 108, 111, and 114 over a medium distance, the blue LED, the red LED, and the green LED transmit the transmission data 108, the transmission data 111, and the transmission data 114, respectively, at light intensity 2. Additionally, the transmission apparatus transmits pieces of transmission data 109, 112, and 115 over a long distance, the blue LED, the red LED, and the green LED transmit the transmission data 109, the transmission data 112, and the transmission data 115, respectively, at light intensity 3. The inverted PPM method is applied to the signals shown in FIG. 4. A blotted portion and a gap portion in the drawing correspond to light-emission ON and light-emission OFF, respectively. This can realize differentiation of information according to a distance, which cannot be realized with constant light intensity.

Additionally, in the case of light having the same wavelength (the same color), when lights having different intensities are simultaneously emitted, a weaker (darker) light is buried in a stronger (brighter) light and a signal attached to the weaker light may not be distinguished. Accordingly, the transmitting apparatus performs time division according to the emitting light intensity to prevent the weaker signal from being buried.

The tri-color LEDs assigns different pieces of data to each color before the transmission over the short distance, the medium distance, and the long distance, whereby it is possible to transmit more data than the case of performing the communication with single-color light.

Furthermore, since wavelengths which reaching light differ depending on the distances in the example of FIG. 3, the color may differ depending on the distances. However, since the tri-colored light travels over each distance in the example of FIG. 4, it is possible to make the color of light the same regarding all of the distances.

Figure 5:
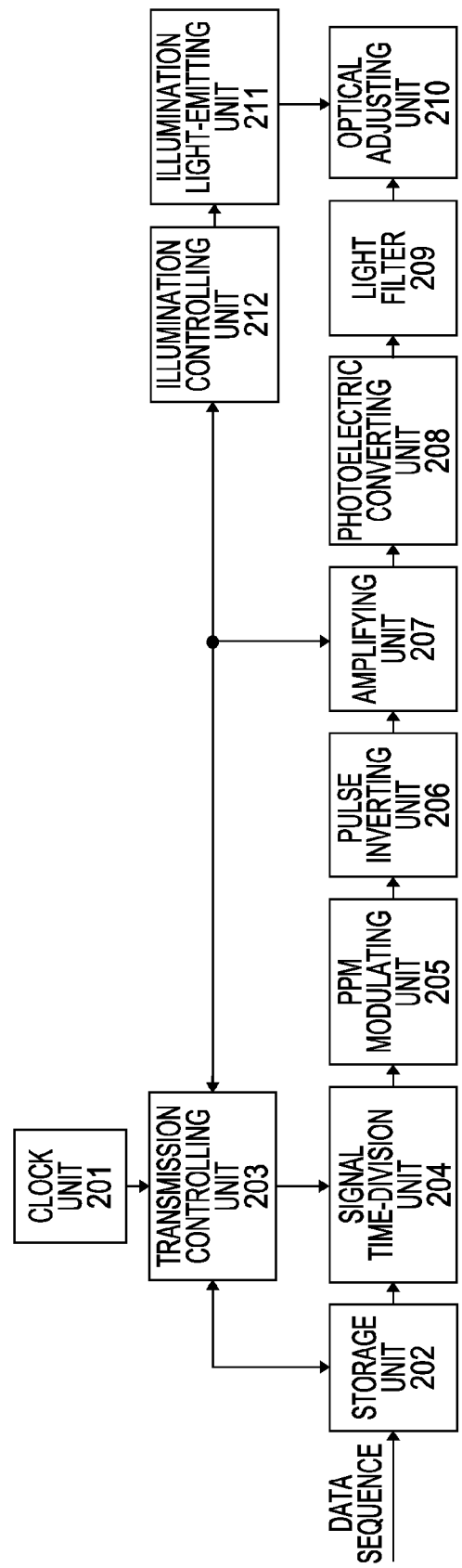
FIG. 5 is a diagram showing a first configuration of a transmitting apparatus.

FIG. 5 shows a diagram of a configuration of a transmitting apparatus of the present invention. The transmitting apparatus is an illuminating apparatus including a single-color LED. The transmitting apparatus employs the inverted PPM method as a signal modulating section and transmits signals shown in FIG. 1.

The transmitting apparatus includes a clock unit 201, a storage unit 202, a transmission controlling unit 203, a signal time-division unit 204, a PPM modulating unit 205, a pulse inverting unit 206, an amplifying unit 207, a photoelectric converting unit 208, a light filter 209, an optical adjusting unit 210, an illumination light-emitting unit 211, and an illumination controlling unit 212.

A data sequence includes various data, such as header information, transmission data to a short distance (short distance data), transmission data to a medium distance (medium distance data), and transmission data to a long distance (long distance data).

The clock unit 201 supplies the transmission controlling unit 203 with a clock signal for matching timings between elements needed to be synchronized. The transmission controlling unit 203 controls the storage unit 202, the signal time-division separating unit 204, and the amplifying unit 207 to control signals to be transmitted. The transmission controlling unit 203 is also connected to the illumination controlling unit 212 and can adjust the intensity of the illuminating light according to the intensity of the signals.

The storage unit 202 temporarily stores a data sequence, which is a sequence of data of "0" and "1" sent from a main storage device, not shown. The signal time-division separating unit 204 assigns a time slot to each of the short distance data, the medium distance data, and the long distance data. The PPM modulating unit 205 converts the data sequence into ON/OFF pulses to perform PPM modulation. The pulse inverting unit 206 inverts ON/OFF of the PPM signal modulated by the PPM modulating unit 205 to generate an inverted PPM signal.

The amplifying unit 207 amplifies the inverted PPM signal to make the signal suitable for communication. The photoelectric converting unit 208 converts the output signal (an electric signal) of the amplifying unit 207 into an optical signal. The light filter 209 eliminates excess frequency components from this optical signal and extracts frequency components corresponding to a desired luminescent color. The optical adjusting unit 210 includes an optical system, such as a reflecting mirror, a lens, and a shade for illumination that controls the directivity of the light, and the optical adjusting unit 210 irradiates an optical signal (visible light) from the light filter 209. The illumination light-emitting unit 211 includes a light-emitting element such as an LED or the like, and a section for adding an offset to set the visible light irradiated by the optical adjusting unit 210 to light intensity desired by users as the illumination, and the illumination light-emitting unit 211 performs light emission. By this, the optical adjusting unit 210 irradiates visible light (illuminating light) having the intensity that is the offset-added intensity of the optical signal from the light filter 209.

Figure 6:
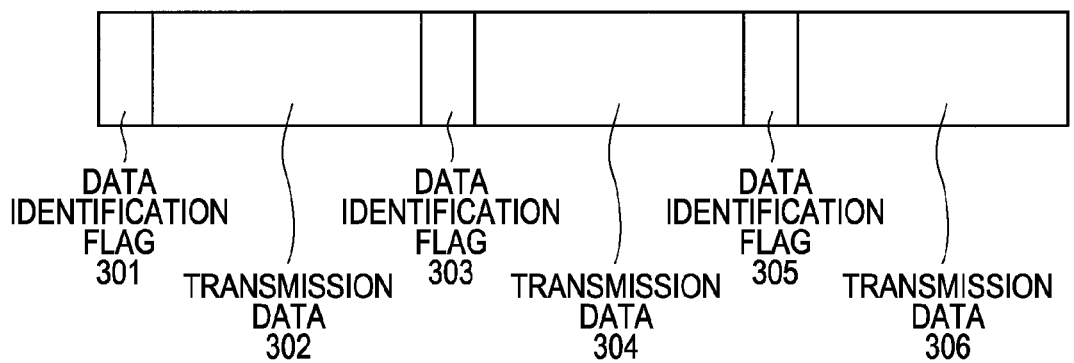
FIG. 6 is a diagram showing an example of a data sequence.

A transmission procedure in the transmission apparatus of FIG. 5 is described below. Transmission target data is stored in a main storage unit, not shown. A CPU, not shown, attaches a data identification flag corresponding to the transmission distance to the transmission target data to create a data sequence and sends the data sequence to the storage unit 202. More specifically, as shown in FIG. 6, the CPU attaches a data identification flag 301 to transmission data 302, a data identification flag 303 to transmission data 304, and a data identification flag 305 to transmission data 306 to create a data sequence. These data identification flags 301, 303, and 305 allow transmission distances of the transmission target data 302, 304, and 306 to be distinguished.

The transmission controlling unit 203 performs time-division processing, as shown in FIG. 1, on the transmission target data stored in the storage unit 202 on the basis of the data identification flag attached to the transmission target data and attaches a packet header, such as a preamble for synchronization, to each transmission data. The PPM modulating unit 205 performs PPM modulation on the header-attached transmission data. The pulse inverting unit 206 generates an inverted PPM signal.

The transmission controlling unit 203 instructs the amplifying unit 207 to amplify the voltage for each time slot so that the short distance data has the light intensity 1, the medium distance data has the light intensity 2, and the long distance data has the light intensity 3. This can realize differentiation of visible-light-signal receivable distances.

Figure 7:
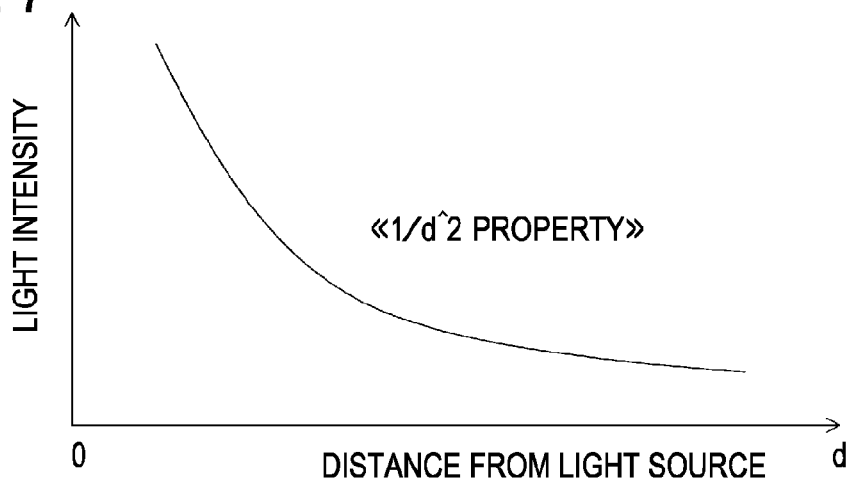
FIG. 7 is a diagram showing a correspondence between a distance from a light source and light intensity.

As shown in FIG. 7, the light attenuates inversely proportional to the square of the distance. Thus, to attempt to obtain light intensity at a distance d from a transmitting apparatus (a light source), the light intensity at the light source is $a \times d^2/b$ (where, b is an attenuation coefficient of light having a given wavelength). The light intensity is decided on the basis of this expression.

Figure 8:
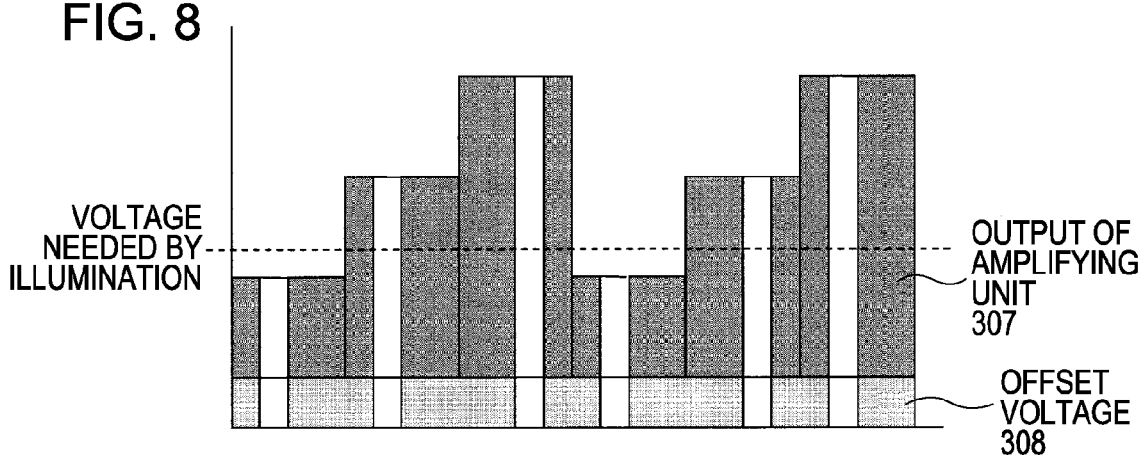
FIG. 8 is a diagram showing processing of a light adjusting unit.

The illumination controlling unit 212 decides the voltage necessary for setting the light intensity of the entire illuminating light to the light intensity used as an illumination and issues an instruction to the illumination light-emitting unit 211, which is shown in FIG. 8 more specifically. To obtain the light intensity needed by users, it is necessary to apply the voltage (average) shown by a broken line to the LED. However, an output 307 obtained by simply amplifying the transmission data is not enough. In this case, the illumination light-emitting unit 211 adds an offset 308 to an ON-portion to set the average voltage to the necessary voltage. Although the offset is added only to the ON-portion in FIG. 8, the same offset voltage may be added to an OFF-portion.

The illumination light-emitting unit 211 performs light emission at the voltage instructed by the illumination controlling unit 212. At this time, the optical system of the optical adjusting unit 210 may apply the directivity to the emitted light. In addition, the offset adding operation may be performed in the amplifying unit 207. The optical adjusting unit 210 irradiates illuminating light having the intensity that is the offset-added intensity of an optical signal from the light filter 209. Through the above-described procedure, visible light signals shown in FIG. 1 can be generated.

Figure 9:
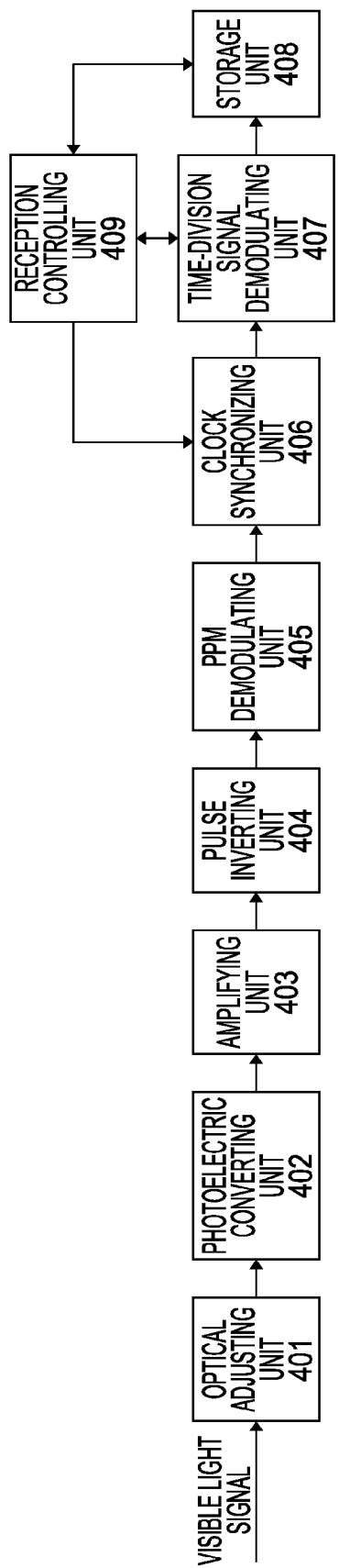
FIG. 9 is a diagram showing a first configuration of a receiving apparatus.

FIG. 9 shows a configuration diagram of a receiving apparatus of the present invention. The receiving apparatus of FIG. 9 includes an optical adjusting unit 401, a photoelectric converting unit 402, an amplifying unit 403, a pulse inverting unit 404, a PPM demodulating unit 405, a clock synchronizing unit 406, a time-division signal demodulating unit 407, a storage unit 408, and a reception controlling unit 409.

The optical adjusting unit 401 includes an optical system, such as a mirror and a lens, and a light filter. The optical adjusting unit extracts only optical signals corresponding to transmission data. The photoelectric converting unit 402 includes a light receiving element represented by a photodiode and a CCD camera and converts optical signals into electric signals. The amplifying unit 403 amplifies the electric signal converted by the photoelectric converter 402 to a demodulation-performable level. The pulse inverting unit 404 inverts ON/OFF of the amplified signal (inverted PPM signal) to obtain a PPM signal. The PPM demodulating unit 405 demodulates this PPM signal to a data sequence, which is a sequence of data of "0" and "1". The reception controlling unit 409 controls the clock synchronizing unit 406, the time-division signal demodulating unit 407, and the storage unit 408. The clock synchronizing unit 406 includes a clock generator therein and synchronizes the demodulated data. The time-division signal demodulating unit 407 demodulates time-division multiplexed transmission data. The storage unit 408 temporarily stores the data. Meanwhile, the photoelectric converting unit 402 and the amplifying unit 403 may be an integrated type as represented by a phototransistor.

A reception procedure in the receiving apparatus of FIG. 9 is described below. The light received at the optical adjusting unit 401 is filtered by a light filter included therein and only light having necessary frequencies is extracted. The extracted light is converted into an electric signal at the photoelectric converting unit 402 and is amplified at the amplifying unit 403. The pulse inverting unit 404 and the PPM demodulating unit 405 invert the amplified signal (inverted PPM signal) to obtain a PPM signal and demodulate the PPM signal into a data sequence, which is a sequence of data of "0" and "1". Thereafter, the time-division signal demodulating unit 407 divides the data sequence for each header to generate the transmission target data.

Figure 10:
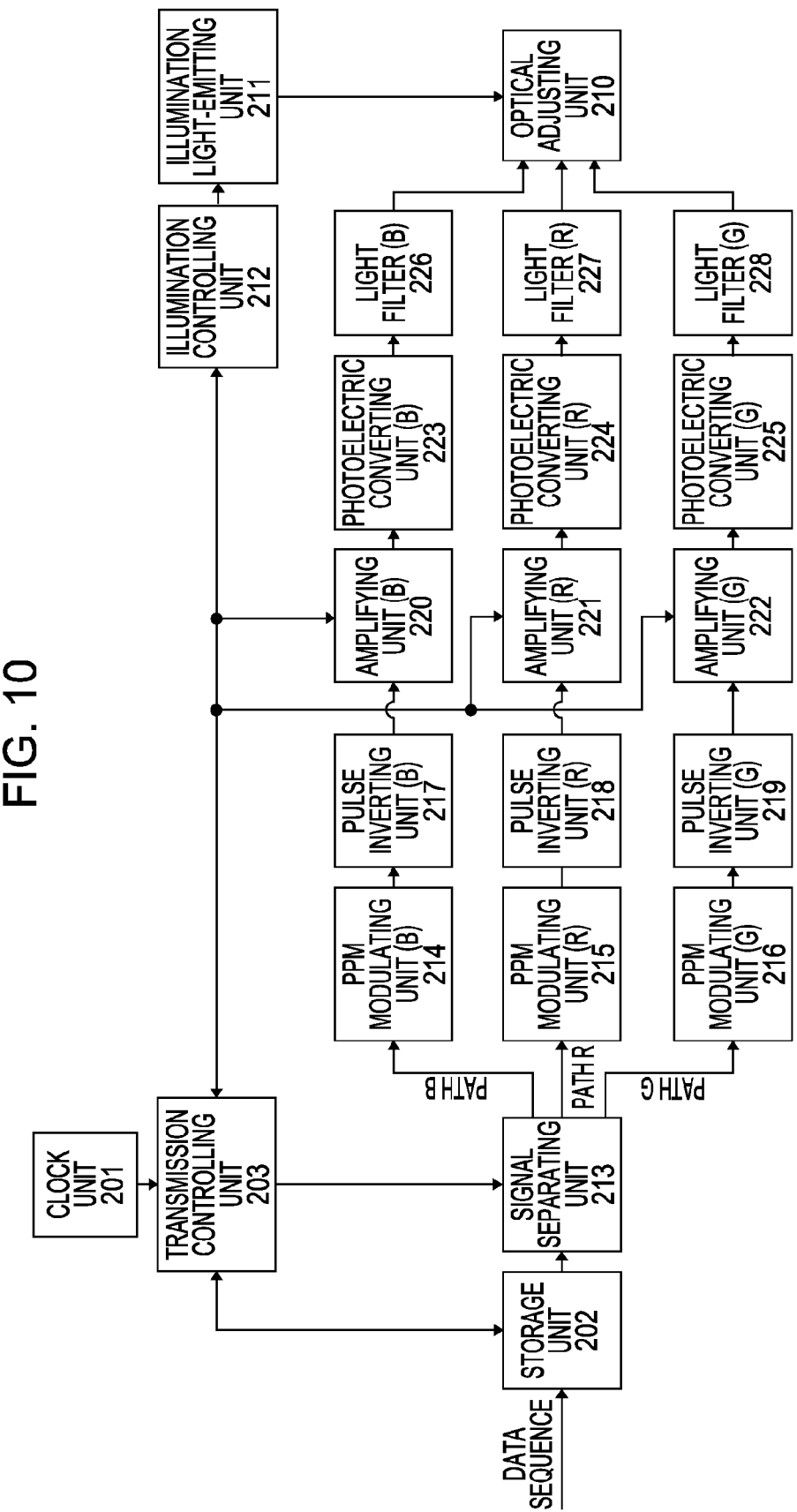
FIG. 10 is a diagram showing a second configuration of a transmitting apparatus.

FIG. 10 shows an example of another configuration of a transmitting apparatus of the present invention. The transmitting apparatus of FIG. 10 is an illuminating apparatus including tri-color LEDs (a red LED, a blue LED, and a green LED). This transmitting apparatus includes a storage unit 202, a signal separating unit 213, PPM modulating units 214, 215, and 216, pulse inverting units 217, 218, and 219, amplifying units 220, 221, and 222, photoelectric converting units 223, 224, and 225, light filters 226, 227, and 228, an optical adjusting unit 210, an illumination light-emitting unit 211, an illumination controlling unit 212, a transmission controlling unit 203, and a clock unit 201.

The clock unit 201 supplies the transmission controlling unit 203 with a clock signal for matching timings between elements needed to be synchronized. The transmission controlling unit 203 controls the storage unit 202, the signal separating unit 213, and the amplifying units 220, 221, and 222 to control signals to be transmitted. The transmission controlling unit 203 is also connected to the illumination controlling unit 212 and can adjust the intensity of the illuminating light according to the intensity of the signals.

The storage unit 202 temporarily stores a data sequence, which is a sequence of data of "0" and "1" sent from a main storage device, not shown. The signal separating unit 213 divides a data sequence into each of short distance data, medium distance data, and long distance data, and sends out the signal to a path corresponding to each distance.

Each of the PPM modulating unit, the pulse inverting unit, the amplifying unit, the photoelectric converting unit, and the light filter is provided for each of red, blue, and green LEDs. That is, three sets are provided. The PPM modulating units 214, 215, and 216 convert input data into a PPM signal composed of ON/OFF pulses. The pulse inverting units 217, 218, and 219 invert the PPM signal obtained by the modulation of the PPM modulating units 214, 215, and 216 at the preceding stage to generate an inverted PPM signal. The amplifying units 220, 221, and 222 amplify the inverted PPM signal to make the signal suitable for communication. The light filters 226, 227, and 228 eliminate excess frequency components from the amplified signal and extract frequency components corresponding to a desired luminescent color. The optical adjusting unit 210 includes an optical system, such as a reflecting mirror, a lens, and/or a shade for illumination that controls the directivity of the light, and the optical adjusting unit 210 irradiates an optical signal (visible light) from the light filters 226, 227, and 228. The illumination light-emitting unit 211 has light-emitting means such as an LED or the like and means for adding an offset to set the visible light irradiated by the optical adjusting unit 210 to a light intensity desired by users as illumination, and the illumination light-emitting unit 211 performs light emission. By this, the optical adjusting unit 210 irradiates visible light (illuminating light) having the intensity that is the offset-added intensity of the optical signal from the light filter 209.

A procedure of transmitting signals shown in FIG. 3 in the transmitting apparatus of FIG. 10 is described below. Transmission target data is stored in a main storage unit, not shown. A CPU, not shown, attaches a data identification flag corresponding to a transmission distance to the transmission target data to create a data sequence and sends the data sequence to the storage unit 202. More specifically, as shown in FIG. 6, the CPU attaches the data identification flag 301 to the transmission data 302, the data identification flag 303 to the transmission data 304, and the data identification flag 305 to the transmission data 306 to create a data sequence. The data sequence includes various data, such as header information, short distance data, medium distance data, and long distance data.

The signal separating unit 213 sorts signals to be transmitted based on the data identification flags. Here, the short distance data is sorted into a path B, the medium distance data is sorted into a path R, and the long distance data is sorted into a path G. The signal separating unit 213 also attaches a packet header, such as a preamble for synchronization, to each transmission data at the time of sorting. The PPM modulating units 214, 215, and 216 perform PPM modulation on this header-attached transmission data. The pulse inverting units 217, 218, and 219 generate an inverted PPM signal.

The transmission controlling unit 203 instructs the amplifying units 220, 221, and 222 to amplify the voltage so that the short distance data of the path B has the light intensity 1, the medium distance data of the path R has the light intensity 2, and the long distance data of the path G has the light intensity 3. This can realizes differentiation of visible-light-signal receivable distances.

Additionally, when transmitting the signals shown in FIG. 4, the transmitting apparatus only has to include a time-division signal separating unit instead of the signal separating unit 213 in FIG. 10 and to perform time-division multiplexing. In this case, the optical adjusting unit 210 synchronizes the three colors of light at the time of transmission. This makes the color constant regardless of the distance from the transmitting apparatus and can simplify a procedure of intensity adjustment.

Figure 11:
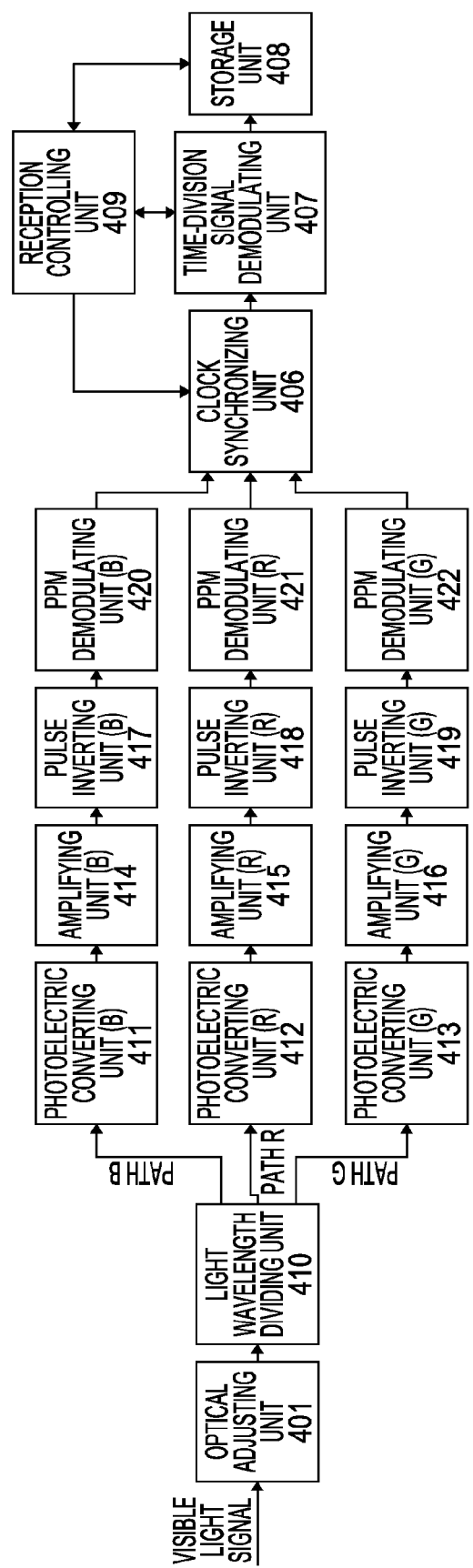
FIG. 11 is a diagram showing a second configuration of a receiving apparatus.

FIG. 11 shows an example of another configuration of a receiving apparatus of the present invention. The receiving apparatus of FIG. 11 includes an optical adjusting unit 401, a light wavelength dividing unit 410, photoelectric converting units 411, 412, and 413, amplifying units 414, 415, and 416, pulse inverting units 417, 418, and 419, PPM demodulating units 420, 421, and 422, a clock synchronizing unit 406, a time-division signal demodulating unit 407, a storage unit 408, and a reception controlling unit 409.

The optical adjusting unit 401 includes an optical system, such as a mirror and a lens, and a light filter. The light wavelength dividing unit 410 includes a light filter and divides light having a plurality of wavelengths into light having a single frequency. The photoelectric converting units 411, 412, and 413 include a light receiving element represented by a photodiode and a CCD camera and the photoelectric converting units 411, 412, and 413 convert optical signals into electric signals. The amplifying units 414, 415, and 416 amplify the electric signal converted by the photoelectric converting units 411, 412, and 413 to a demodulation-performable level. The pulse inverting units 417, 418, and 419 invert ON/OFF of the amplified signal (inverted PPM signal) to obtain a PPM signal. The PPM demodulating units 420, 421, and 422 demodulate this PPM signal to a data sequence which is a sequence of data of "0" and "1". The reception controlling unit 409 controls the clock synchronizing unit 406, the time-division signal demodulating unit 407, and the storage unit 408. The clock synchronizing unit 406 includes a clock generator therein and synchronizes the demodulated data. The time-division signal demodulating unit 407 demodulates time-division multiplexed transmission data. The storage unit 408 temporarily stores the data.

A reception procedure in the receiving apparatus of FIG. 11 is described below. It is assumed that the transmitting apparatus sends out three colored light of red, blue, and green. The light received at the optical adjusting unit 401 is filtered by a light filter of the light wavelength dividing unit 410 and only light having frequencies of red, blue, and green is extracted. The red light, the blue light, and the green light are distributed to a path R, a path B, and a path G, respectively. These lights are converted into electric signals at the photoelectric converting units 411, 412, and 413 and are amplified at the amplifying units 414, 415, and 416. The pulse inverting units 417, 418, and 419 and the PPM demodulating units 420, 421, and 422 invert the amplified signal (inverted PPM signal) to obtain a PPM signal and demodulate the PPM signal into a data sequence which is a sequence of data of "0" and "1". Thereafter, the time-division signal demodulating unit 407 divides the data sequence for each header to generate the transmission target data.

Meanwhile, the receiving apparatus of FIG. 11 can be applied not only to a case of receiving light from an illuminating apparatus including multicolor LEDs but also to a case of receiving light from an LED display or a liquid crystal.

Figure 12:
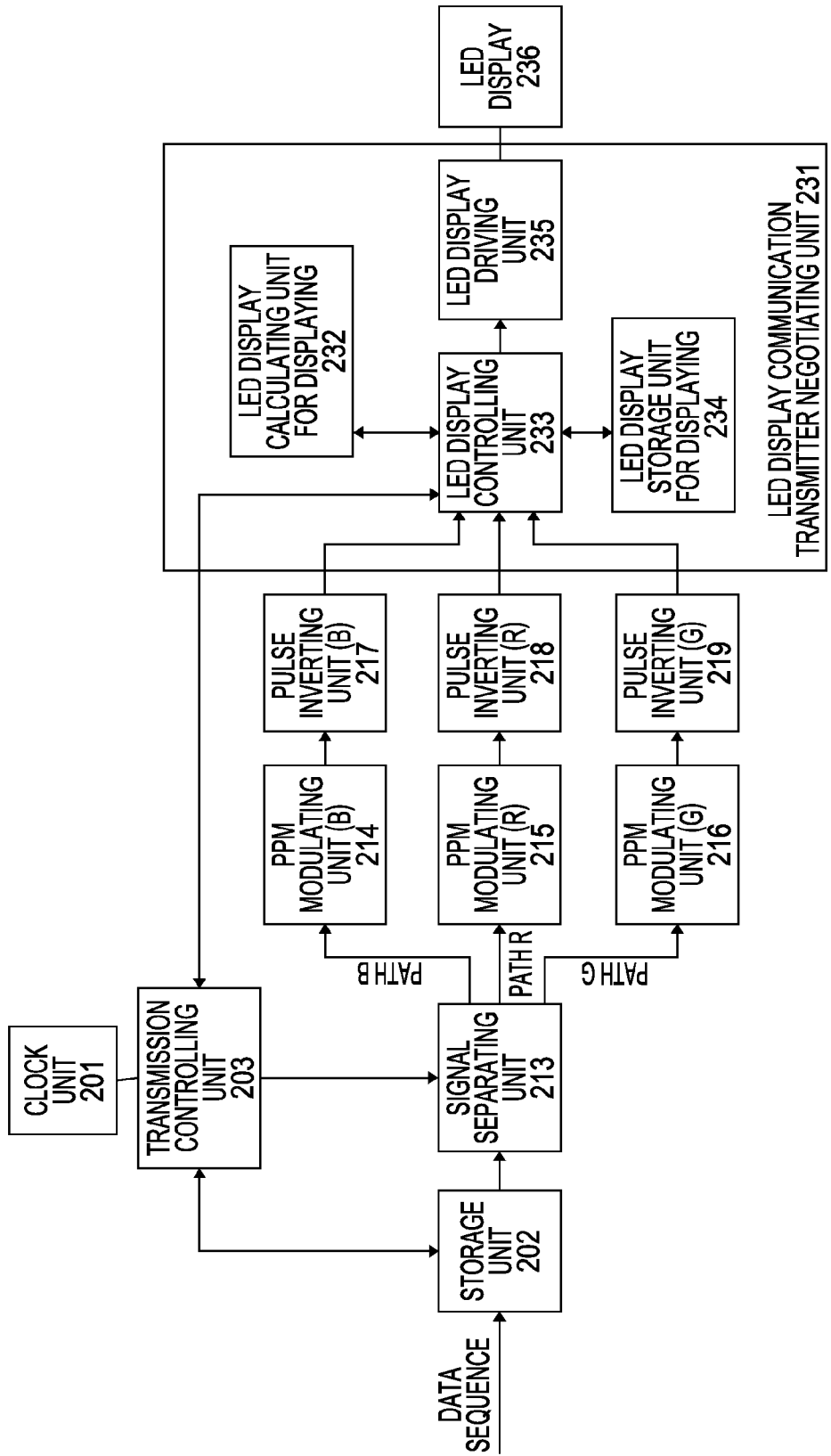
FIG. 12 is a diagram showing a third configuration of a transmitting apparatus.

In addition, in a transmitting apparatus, the amplifying units 220, 221, and 222, the photoelectric converting units 223, 224, and 225, the light filters 226, 227, and 228, the optical adjusting unit 210, the illumination light-emitting unit 211, and the illumination controlling unit 212, which are in the multi-color illuminating apparatus shown in FIG. 10, may include an LED display communication transmitter negotiating unit 231 having a LED display calculating unit for displaying 232, an LED display controlling unit 233, an LED display driving unit 235, and a LED display storage unit for displaying 234, and may include an LED display or an LED liquid crystal having an LED display 236, which are shown in FIG. 12.

Figure 13:
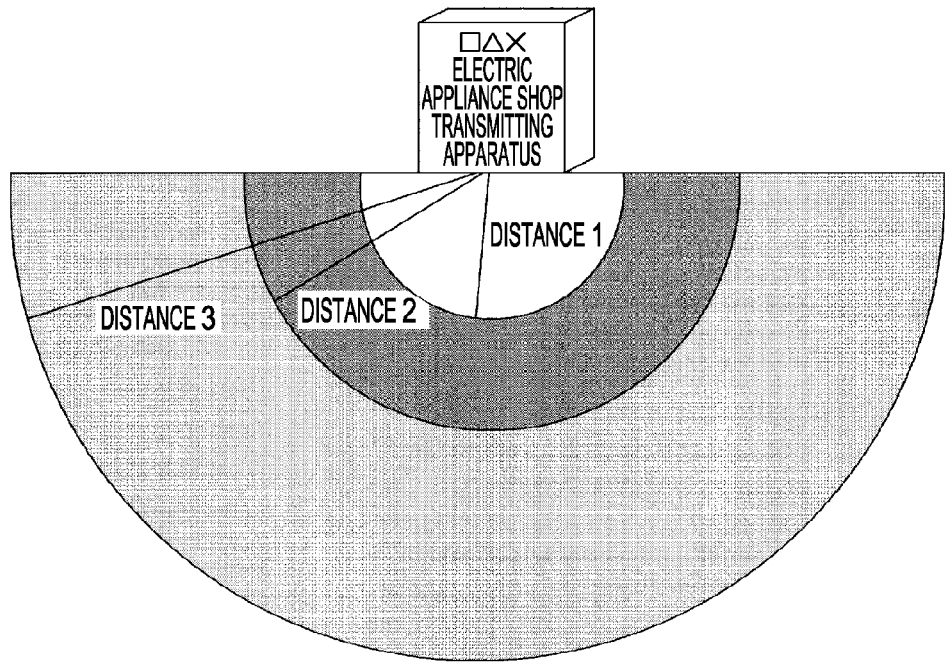
FIG. 13 is a diagram showing a first embodiment of an information providing system employing a transmitting apparatus.
Figure 14:
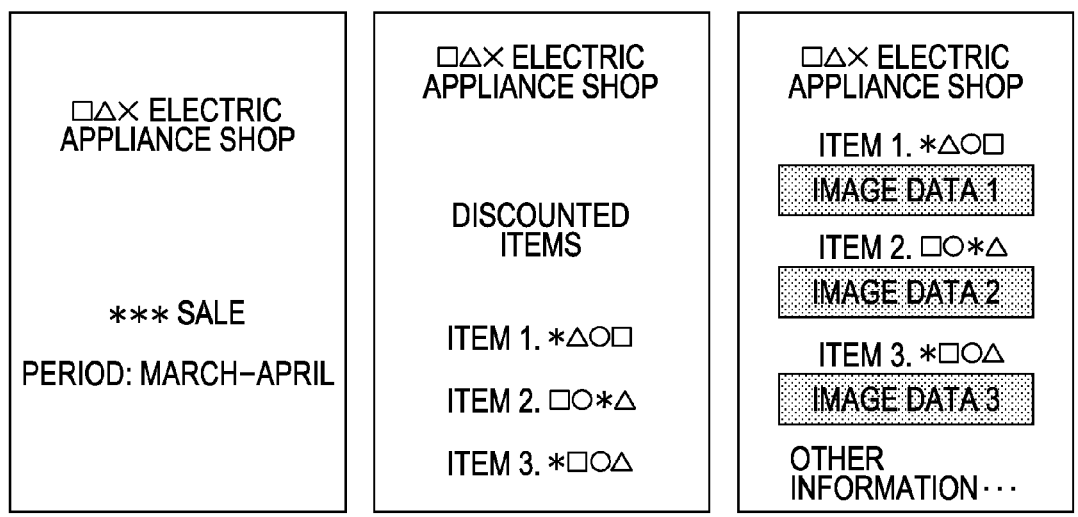
FIG. 14 is a diagram showing an example of displayed screens of a receiving terminal in an information providing system.

FIG. 13 shows a first embodiment of an information providing system employing a transmitting apparatus of the present invention. It is assumed that the transmitting apparatus has only a single light source in FIG. 13. It is also assumed that an LED display or the like is used as the transmitting apparatus and an optical adjusting unit of the transmitting apparatus emits light over a wide range using a convex lens. In FIG. 13, three kinds of data that differ according to distances are transmitted from the transmitting apparatus. More specifically, as shown in FIG. 14, long distance data only includes headline data (FIG. 14(1)), medium distance data includes detailed description data (FIG. 14(2)), and short distance data includes data of drawings or the like (FIG. 14(3)). In addition, it is possible to include screen configuration information based on the degree of acquired data and an audio output method in a header part of the long distance data.

Figure 15:
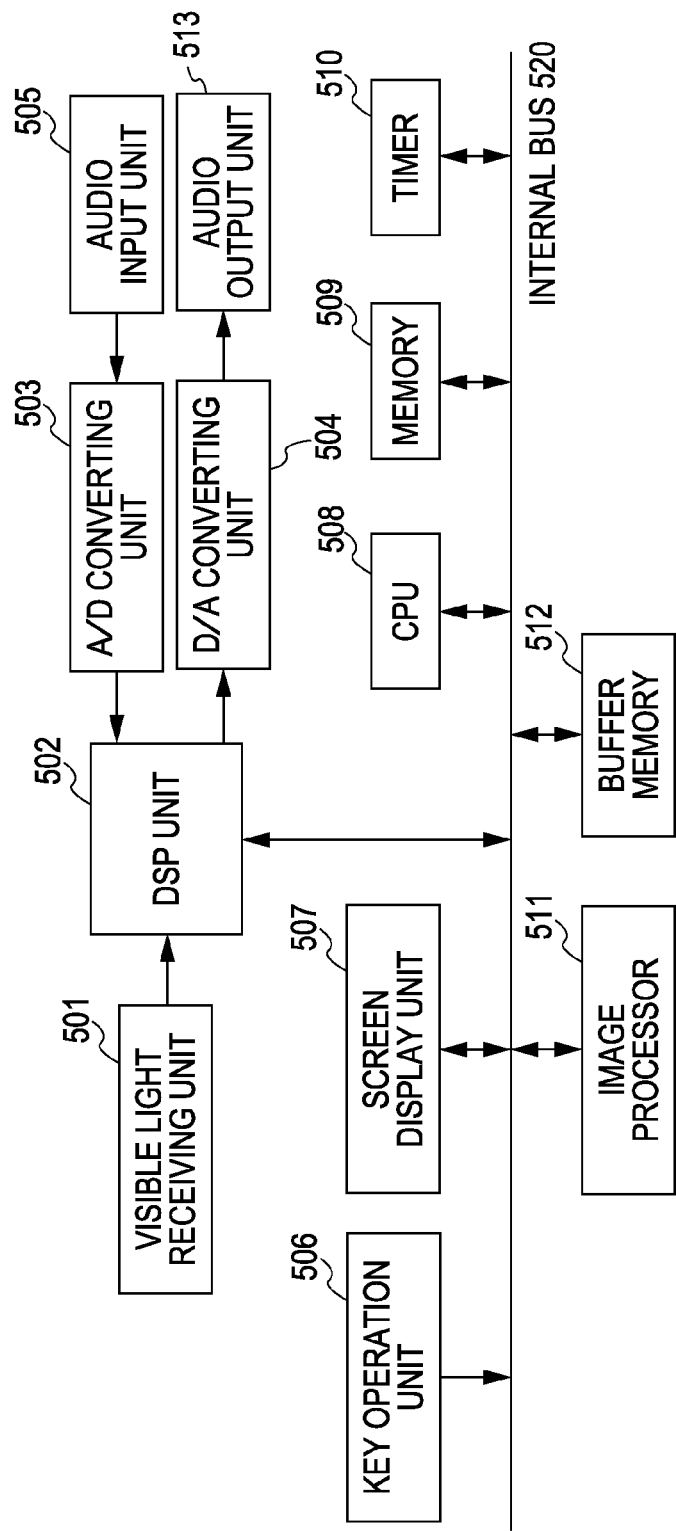
FIG. 15 is a diagram showing a configuration of a receiving terminal.

FIG. 15 shows a configuration diagram of a receiving terminal in an information providing system. A visible light receiving unit 501 is a receiving apparatus shown in FIG. 9 or FIG. 11 and performs reception and demodulation of a visible light signal. A DSP (Digital Signal Processor) 502 processes the data demodulated by the visible light receiving unit 501. A D/A (Digital/Analog) converting unit 504 converts a digital audio signal or the like output by the DSP 502 into an analog audio signal and supplies the analog audio signal to an audio output unit 513, such as a speaker. An A/D (Analog/Digital) converting unit 503 converts an analog audio signal input from an audio input unit 505, such as a microphone, into a digital audio signal and supplies the digital audio signal to the DSP 502. A key operation unit 506 has, for example, a numeral keypad, an on-hook key, an off-hook key, a power button, and a function selection key (function key), and performs processing for accepting various key input as well as dial input performed by users. A screen display unit 507 includes, for example, a liquid crystal display or a liquid crystal touch panel and performs display of various images, messages, and menu screens as well as various displays regarding communication.

Figure 16:
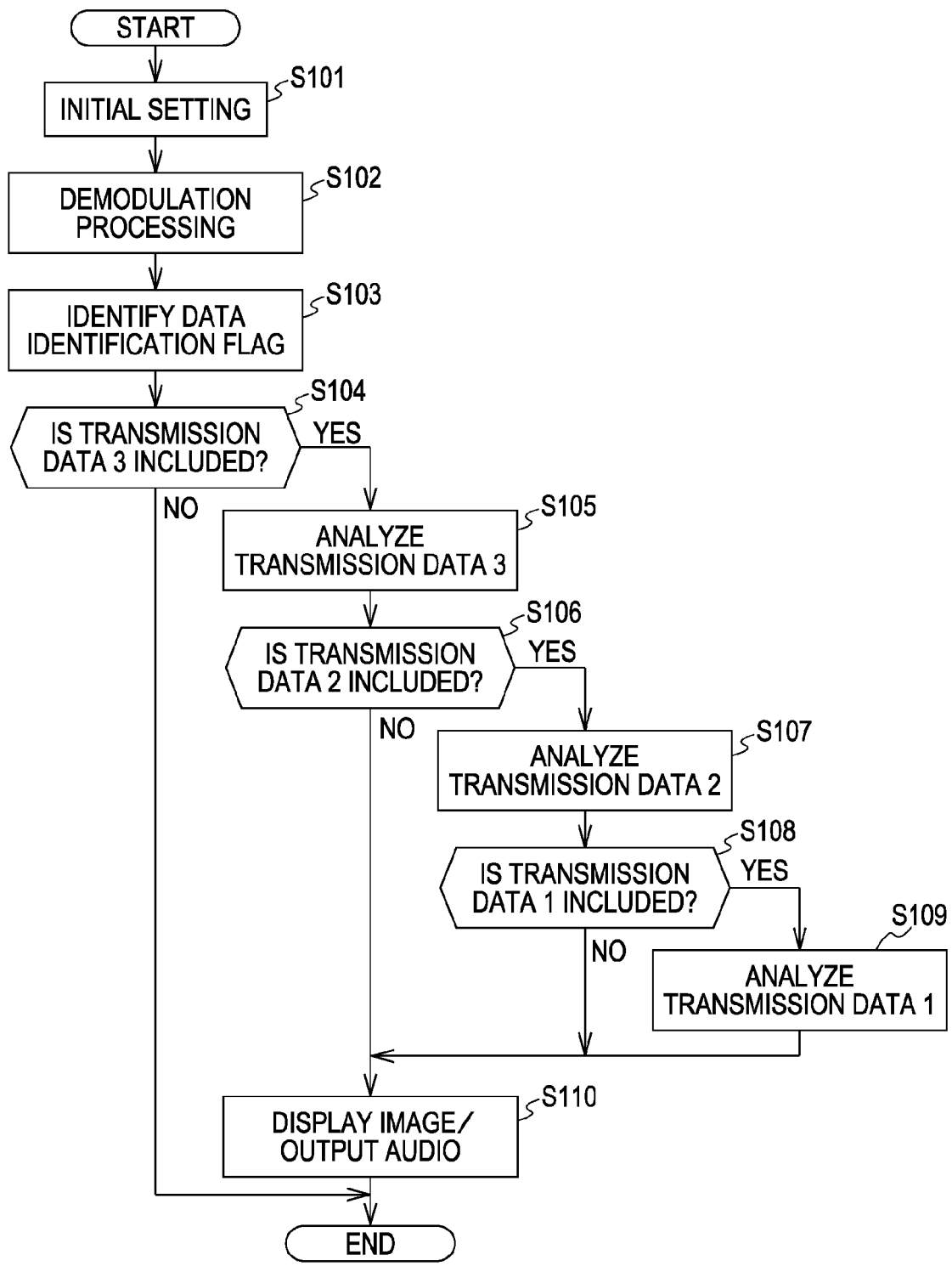
FIG. 16 is a flowchart showing a first operation of a receiving terminal.

FIG. 16 is a flowchart showing an operation of the receiving terminal of FIG. 15. After the receiving terminal performs initial setting for reception of data (S101), the visible light receiving unit 501 performs reception and demodulation of a visible light signal to generate a data sequence (S102). A CPU 508 identifies data identification flags included in the data sequence demodulated by the visible light receiving unit 501 (S103).

The CPU 508 then determines whether or not the data sequence includes transmission data 3, which is long distance data, on the basis of the identified data identification flags (S104). If the transmission data 3 is not included, the receiving terminal is brought back to a data receiving state. On the other hand, if the transmission data 3 is included, the CPU 508 analyzes this transmission data 3 and stores the result in a buffer memory 512 (S105).

The CPU 508 determines whether or not the data sequence include transmission data 2, which is medium distance data, on the basis of the identified data identification flags next (S106). If the transmission data 2 is not included, the CPU 508 issues an instruction for construction/display of an image to an image processor 511. According to this instruction, the image processor 511 performs construction and display of an image shown in FIG. 14(1) using only the transmission data 3 on the basis of screen configuration data included in the transmission data 3. The CPU 508 also issues an audio output instruction to the DSP 502. According to this instruction, the DSP 502 performs audio output processing on the basis of audio output method data included in the transmission data 3 (S110). On the other hand, if the data sequence includes the transmission data 2, the CPU 508 analyzes this transmission data 2 and stores the result in the buffer memory 512 (S107).

The CPU 508 then determines whether or not the data sequence includes transmission data 1, which is short distance data, on the basis of the identified data identification flags (S108). If the transmission data 1 is not included, the CPU 508 issues an instruction of construction/display of an image to the image processor 511. According to this instruction, the image processor 511 performs construction and display of an image shown in FIG. 14(2) using the transmission data 3 and the transmission data 2 on the basis of the image configuration data included in the transmission data 3. The CPU 508 also issues an audio output instruction to the DSP 502. According to this instruction, the DSP 502 performs audio output processing on the basis of audio output method data included in the transmission data 3 (S110).

On the other hand, if the data sequence includes the transmission data 1, the CPU 508 analyzes this transmission data 1 and stores the result in the buffer memory 512 (S109). Furthermore, the CPU 508 issues an instruction of construction/display of an image to the image processor 511. According to this instruction, the image processor 511 performs construction and display of an image shown in FIG. 14(3) using the transmission data 3, the transmission data 2, and the transmission data 1 on the basis of image configuration data included in the transmission data 3. The CPU 508 also issues an audio output instruction to the DSP 502. According to this instruction, the DSP 502 performs audio output processing on the basis of audio output method data included in the transmission data 3 (S110).

Figure 17:
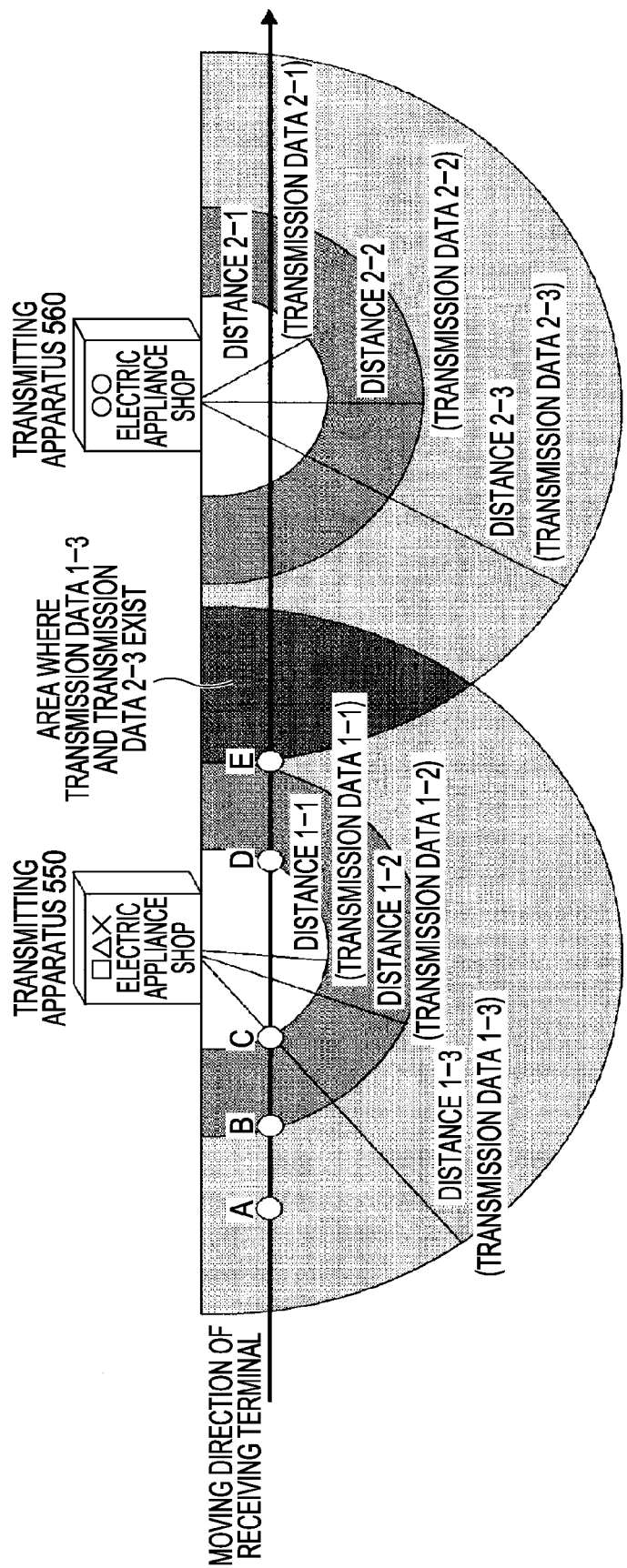
FIG. 17 is a diagram showing a second embodiment of an information providing system employing a transmitting apparatus.
Figure 18:
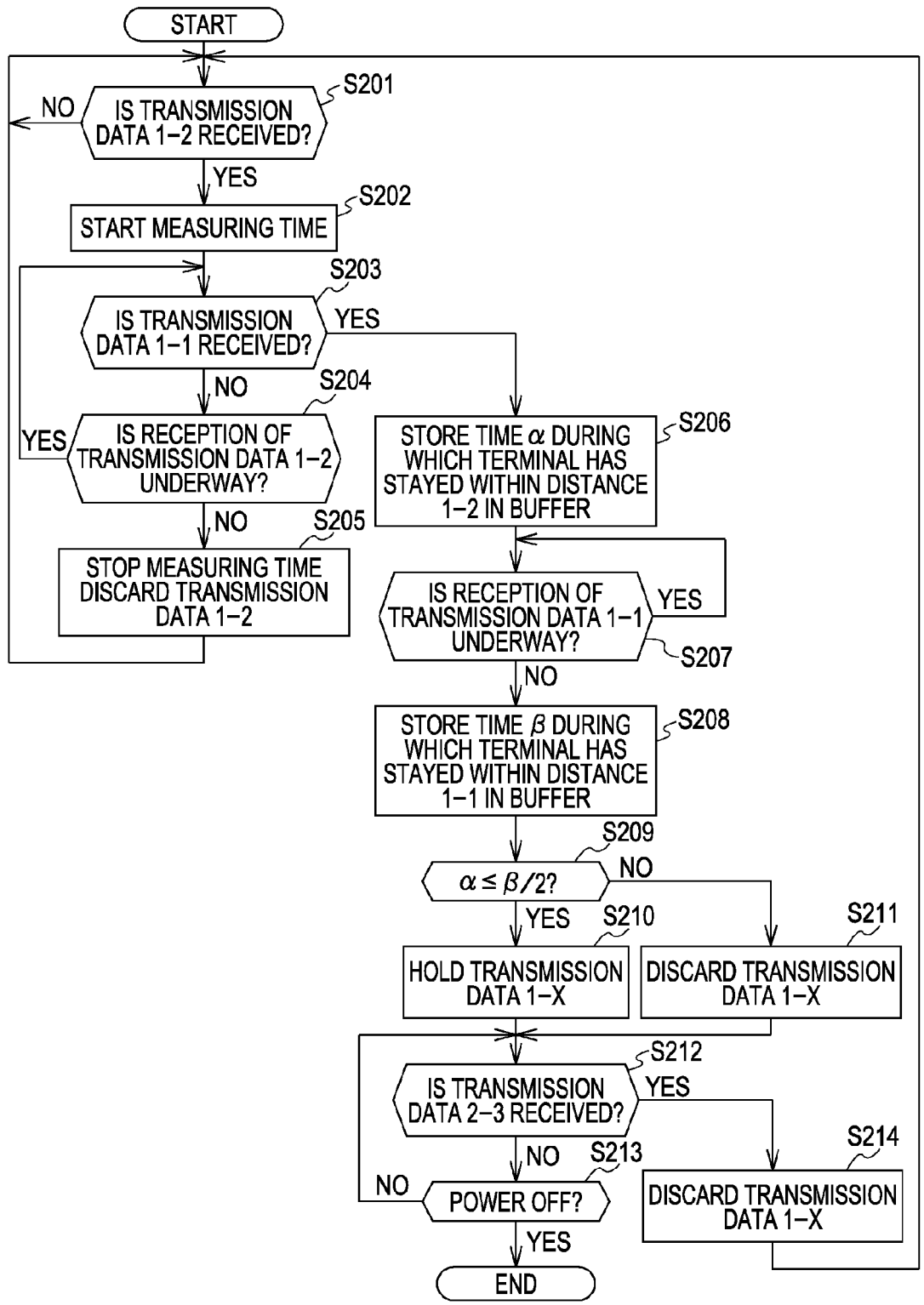
FIG. 18 is a flowchart showing a second operation of a receiving terminal.

FIG. 17 shows a second embodiment of an information providing system employing transmitting apparatuses of the present invention. In FIG. 17, light sources 550 and 560 that are two transmitting apparatuses of LED displays exist and a receiving terminal passes in front of these two transmitting apparatuses 550 and 560. A reception operation of the receiving apparatus in this case is shown in a flowchart of FIG. 18.

At a point A of FIG. 17, the receiving terminal is already in a state of receiving transmission data 1-3 transmitted by the light source 550. In this case, the receiving terminal monitors a reception status of transmission data 1-2 (S201). Upon being able to receive the transmission data 1-2 at a point B of FIG. 17, the receiving terminal starts measuring the time with a timer 510 (S202). Furthermore, the receiving terminal monitors a reception status of transmission data 1-1 (S203). If the reception terminal is not receiving the transmission data 1-1 (NO at S203) and can no longer receive the transmission data 1-2 (No at S204), the receiving terminal determines that a user of the receiving terminal has left the light source 550 since the user is not interested in information transmitted by the light source 550, stops measuring the time, and discards the transmission data 1-2 (S205).

On the other hand, if the receiving terminal can receive the transmission data 1-1 at a point C of FIG. 17 (YES at S203), the receiving terminal stores a time α during which the transmission data 1-2 has been received in the buffer memory 512 (S206). Thereafter, if the receiving terminal passes a point D of FIG. 17 and can no longer receive the transmission data 1-1 (NO at S207), the receiving terminal stores a time β during which the transmission data 1-1 has been received in the buffer memory 512 (S208).

The receiving terminal compares ½ of the time β during which the transmission data 1-1 has been received with the time α during which the transmission data 1-2 has been received (S209). If ½ of the time β is equal to or longer than the time α, the receiving terminal determines that the user of the receiving terminal is interested in the information transmitted by the light source 550 and holds each transmission data from the light source 550 (S210). On the other hand, if ½ of the time β is shorter than the time α, the receiving terminal determines that the user of the receiving terminal is not interested in the information transmitted by the light source 550 and discards each transmission data from the light source 550 (S211).

Furthermore, the receiving terminal monitors a reception status of transmission data 2-3 transmitted in a receiving state of a light source 560 that is the next light source (S212). If the receiving terminal can receive the data at a point E of FIG. 17, the receiving terminal determines that the user of the receiving terminal is no longer interested in the information transmitted by the light source 550 and discards each transmission data from the light source 550 (S214). On the other hand, if the receiving terminal cannot receive the transmission data 2-3, the receiving terminal continues to monitor the reception status of the transmission data 2-3 until the receiving terminal is turned off at S213 or until an optical communication application is terminated. The above-described method can prevent the receiving terminal from holding information undesired by the user and unnecessary to the user.

Figure 19:
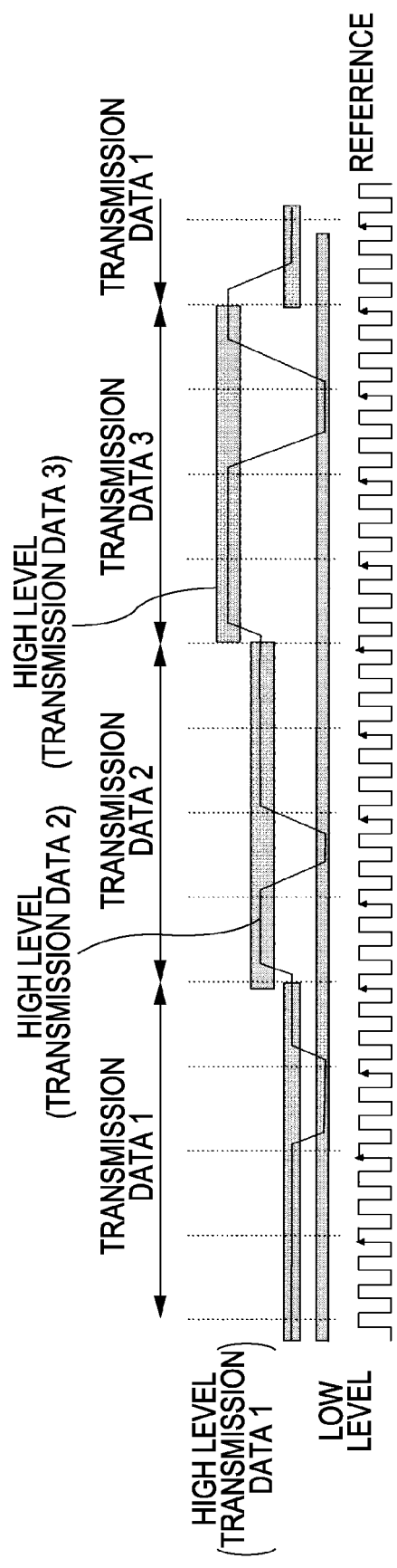
FIG. 19 is a diagram showing a first example of time slot adjustment.

FIG. 19 shows an example of time slot adjustment. If the performance of a receiving apparatus in visible light communication improves, higher-speed ON/OFF modulation is expected to be performed. In this case, intensity of receiving light does not sufficiently decrease in the receiving device due to an influence of a remainder of a signal and the receiving device may mistakenly detect a signal. For example, when a time slot based on a response time from a high level of signals, such as transmission data 101, 107, 110, and 113, to a low level is set in a case where a transmitting apparatus generates signals shown in FIG. 1 and FIG. 4, the intensity of the light may not sufficiently decrease within the set time slot even if the light intensity is dropped from the high level of the transmission data 103, 109, 112, and 115 to the low level.

Figure 20:
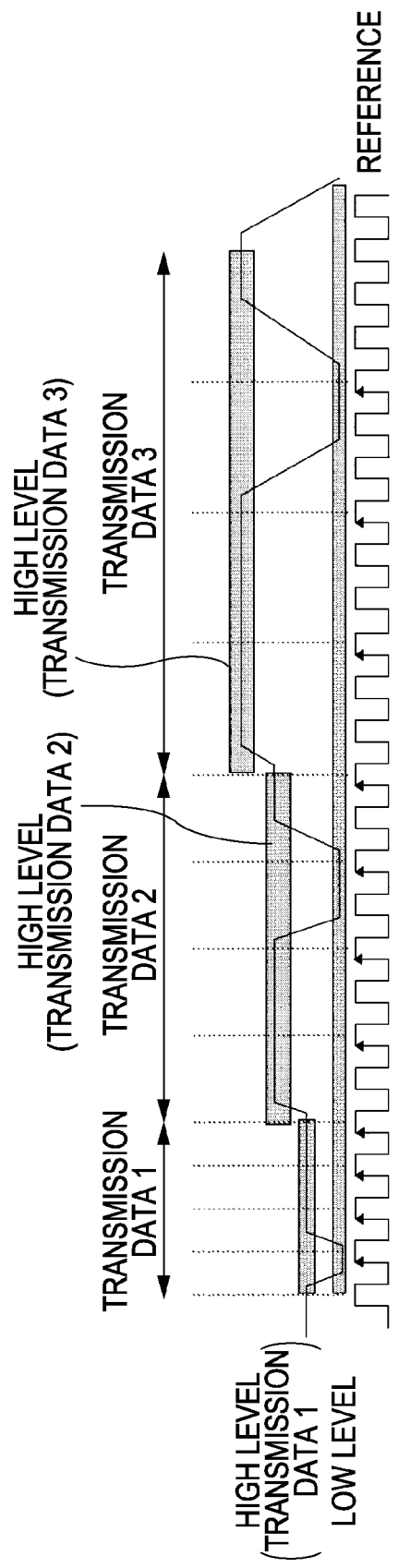
FIG. 20 is a diagram showing a second example of time slot adjustment.
Figure 21:
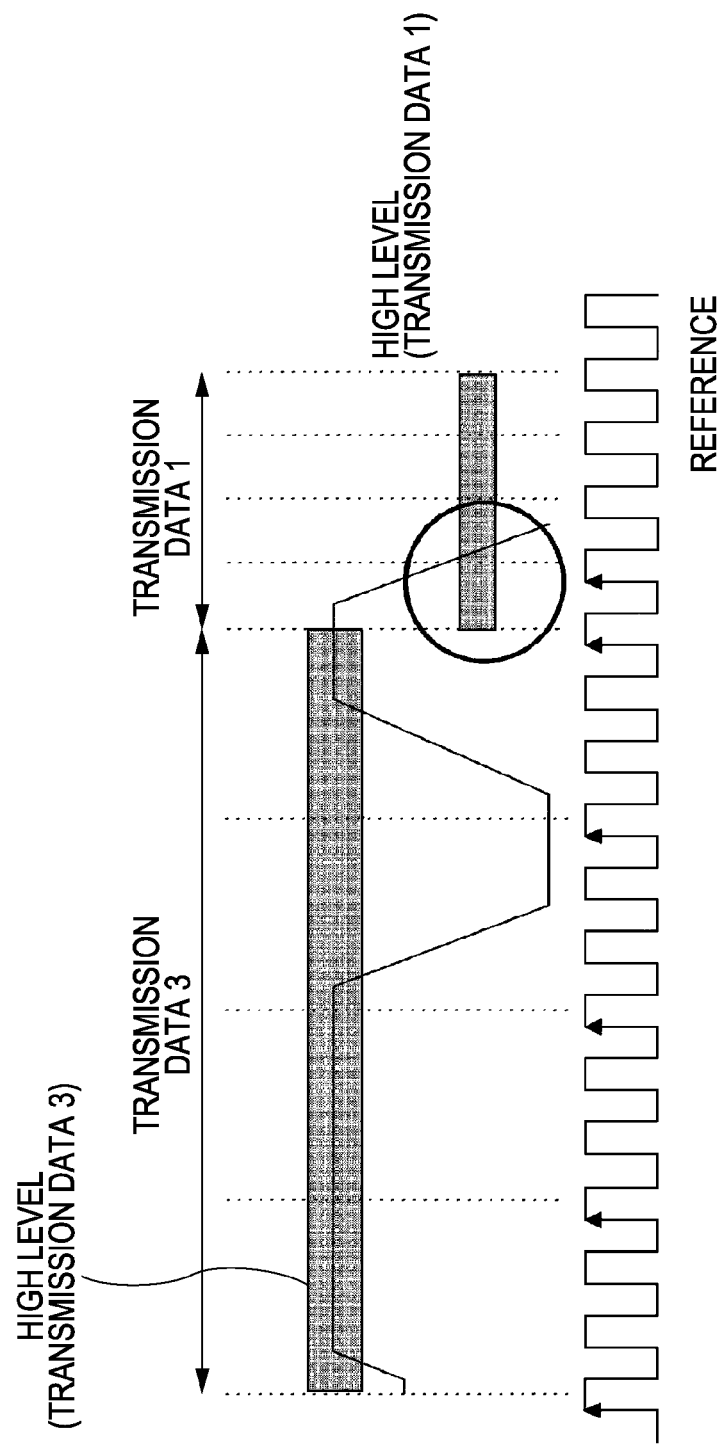
FIG. 21 is a diagram showing a problem in time slot adjustment.
Figure 22:
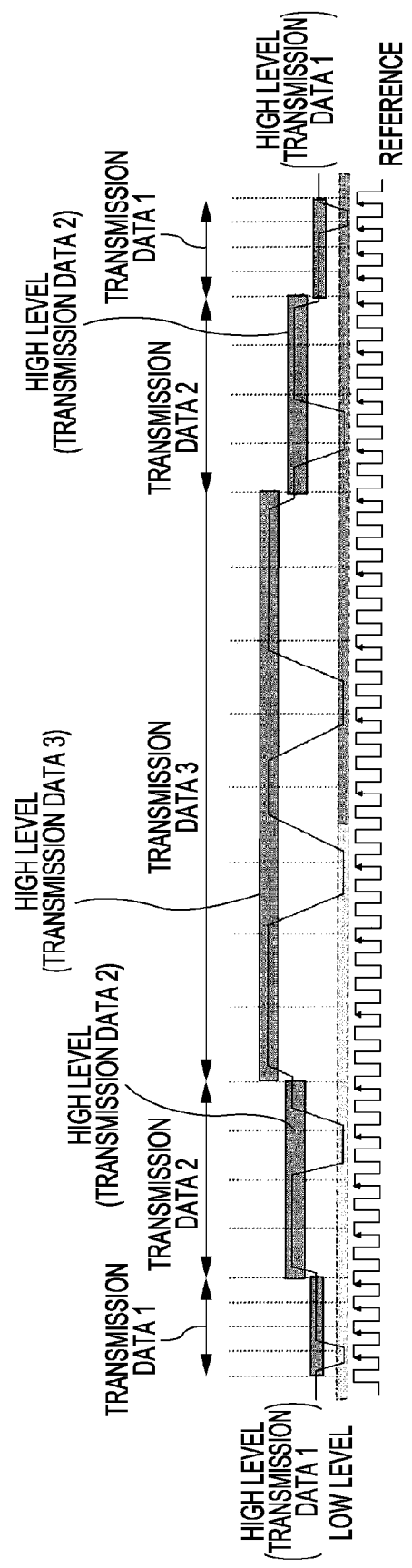
FIG. 22 is a diagram showing a third example of time slot adjustment.

As a measure for such a problem, the transmitting apparatus sets a time slot, shown in FIG. 19, based on a response time from the high level of, for example, the transmission data 103, 109, 112, and 115 to the low level. Furthermore, as shown in FIG. 20, the transmitting apparatus may employ a method for setting a time slot based on a response time from the high level of each transmission data to the low level to corresponding transmission data. In this case, it is possible to perform information transmission at a higher speed than the method for employing a constant time slot shown in FIG. 19. However, as shown in FIG. 21, if the transmitting apparatus performs transmission of the transmission data 1 immediately after the transmission of the transmission data 3, the luminous intensity may not fall to the high level of the transmission data 1 and a waveform of the signal may be distorted. Accordingly, immediately after the transmission of the transmission data 3, the transmitting apparatus inserts a delay corresponding to one bit of the transmission data 3 as an extra slot or performs transmission while switching the order of the transmission data, such as the transmission data 1, 2, 3, 3, 2, 1, 1, 2, . . . , as shown in FIG. 22. This makes the number of time slots the same as the number of transmission data in a unit of time and improves the aforementioned problem. Through the above-described methods, the transmitting apparatus can generate signals that can cope with high-speed ON/OFF control.

As described above, the present invention realizes differentiation of information according to a distance from a light source by changing light intensity in a transmitting apparatus. Further, by measuring a time taken for receiving each signal, it is possible to prevent a receiving terminal from storing unnecessary data. Additionally, in the case of performing high-speed communication, it is possible to prevent a waveform of a signal from being distorted by setting a sufficient time slot width, by setting the time slot width variable according to the intensity of signals, or by changing the transmission order of signals.

INDUSTRIAL APPLICABILITY

As described above, optical communication apparatuses and optical communication methods according to the present invention can perform appropriate communication according to a distance to a receiving apparatus and are useful as optical communication apparatuses and optical communication methods.

The invention claimed is:

1. An optical communication apparatus for receiving an optical signal corresponding to data, the optical communication apparatus comprising:
a light receiving section operable to receive an optical signal from a light source for a length of time, wherein the optical signal comprises a first optical signal which conveys first data and a second optical signal which conveys second data, wherein the second optical signal has a different wavelength than the first optical signal, and wherein an intensity of the optical signal is modulated according to a distance over which the data is to be delivered;
an analyzing section operable to analyze the optical signal received by the light receiving section to acquire the first and second data conveyed by the optical signal;
a storage section operable to store the first and second data; and
a control section operable to
calculate a first value based on a first length of time for receiving the first optical signal, and
not discard the first and second data, if the first value is more than a second value based on a second length of time for receiving the second optical signal.

2. The optical communication apparatus according to claim 1, wherein the light comprises one or more wavelengths, and the receiving section receives an optical signal whose intensity is changed for each of the one or more wavelengths, and the analyzing section analyzes, for each of the one or more wavelengths, the optical signal received by the light receiving section.

3. The optical communication apparatus according to claim 2, wherein the light receiving section receives an optical signal whose intensity is changed for each time slot in time-division multiplexing, and the analyzing section analyzes, for each time slot, the optical signal received by the light receiving section.

4. The optical communication apparatus according to claim 2, wherein the light receiving section receives an optical signal having a wavelength in a visible light region.

5. The optical communication apparatus according to claim 2, wherein the light receiving section receives illuminating light on which an optical signal whose intensity is modulated according to a data-delivering distance is superposed, and the analyzing section extracts the optical signal from the illuminating light received by the light receiving section and analyzes the optical signal.

6. The optical communication apparatus according to claim 2, wherein the light receiving section receives light of an image on which an optical signal whose intensity is modulated according to a data-delivering distance is superposed, and the analyzing section extracts the optical signal from the light of the image received by the light receiving section and analyzes the optical signal.

7. The optical communication apparatus according to claim 2, further comprising: an image displaying section for performing displaying of an image utilizing the data on the basis of screen configuration data attached to the data acquired by the analyzing section.

8. The optical communication apparatus according to claim 1, wherein the light receiving section receives an optical signal whose intensity is changed for each time slot in time-division multiplexing, and the analyzing section analyzes, for each time slot, the optical signal received by the light receiving section.

9. The optical communication apparatus according to claim 1, wherein the light receiving section receives an optical signal having a wavelength in a visible light region.

10. The optical communication apparatus according to claim 1, wherein the light receiving section receives illuminating light on which an optical signal whose intensity is modulated according to a data-delivering distance is superposed, and the analyzing section extracts the optical signal from the illuminating light received by the light receiving section and analyzes the optical signal.

11. The optical communication apparatus according to claim 1, wherein the light receiving section receives light of an image on which an optical signal whose intensity is modulated according to a data-delivering distance is superposed, and the analyzing section extracts the optical signal from the light of the image received by the light receiving section and analyzes the optical signal.

12. The optical communication apparatus according to claim 1, further comprising: an image displaying section for performing displaying of an image utilizing the data on the basis of screen configuration data attached to the data acquired by the analyzing section.

13. The optical communication apparatus according to claim 1, wherein the receiving terminal is configured to determine a state change from a first state to a second state, wherein in the first state the receiving terminal is able to receive a first transmission data and a second transmission data and in the second state the receiving terminal is able to receive only the second transmission data.

14. The optical communication apparatus according to claim 13, wherein the receiving terminal is configured to discard the first transmission data and the second transmission data if the state is changed from the first state to the second state.

15. An optical communication method for receiving an optical signal corresponding to data, the method comprising:
receiving an optical signal from a light source for a length of time, wherein the optical signal comprises a first optical signal which conveys first data and a second optical signal which conveys second data, wherein the second optical signal has a different wavelength than the first optical signal, and wherein an intensity of the optical signal is modulated according to a distance over which the data is to be delivered;
analyzing the received optical signal to acquire the first and second data conveyed by the optical signal;
storing the first and second data in a storage section;
calculating a first value based on a first length of time for receiving the first optical signal, and
not discarding the first and second data, if the first value is more than a second value based on a second length of time for receiving the second optical signal.

16. The optical communication method according to claim 15, wherein an optical signal whose intensity is changed for each of one or more wavelengths of light is received at the light receiving step, and the received optical signal received at the light receiving step is analyzed for each of the one or more wavelengths at the analyzing step.

17. The optical communication method according to claim 16, wherein an optical signal whose intensity is changed for each time slot in time-division multiplexing is received at the light receiving step, and the optical signal received at the light receiving step is analyzed for each time slot at the analyzing step.

18. The optical communication method according to claim 16, wherein an optical signal having a wavelength in a visible light region is received at the light receiving step.

19. The optical communication method according to claim 16, wherein illuminating light on which an optical signal whose intensity is modulated according to a data-delivering distance is superposed is received at the light receiving step, and the optical signal is extracted from the illuminating light received at the light receiving step and is analyzed at the analyzing step.

20. The optical communication method according to claim 16, wherein light of an image on which an optical signal whose intensity is modulated according to a data-delivering distance is superposed is received at the light receiving step, and the optical signal is extracted from the light of the image received at the light receiving step and is analyzed at the analyzing step.

21. The optical communication method according to claim 16, further comprising: an image displaying step of performing displaying an image utilizing the data on the basis of screen configuration data attached to the data acquired at the analyzing step.

22. The optical communication method according to claim 15, wherein an optical signal whose intensity is changed for each time slot in time-division multiplexing is received at the light receiving step, and the optical signal received at the light receiving step is analyzed for each time slot at the analyzing step.

23. The optical communication method according to claim 15, wherein an optical signal having a wavelength in a visible light region is received at the light receiving step.

24. The optical communication method according to claim 15, wherein illuminating light on which an optical signal whose intensity is modulated according to a data-delivering distance is superposed is received at the light receiving step, and the optical signal is extracted from the illuminating light received at the light receiving step and is analyzed at the analyzing step.

25. The optical communication method according to claim 15, wherein light of an image on which an optical signal whose intensity is modulated according to a data-delivering distance is superposed is received at the light receiving step, and the optical signal is extracted from the light of the image received at the light receiving step and is analyzed at the analyzing step.

26. The optical communication method according to claim 15, further comprising: an image displaying step of performing displaying an image utilizing the data on the basis of screen configuration data attached to the data acquired at the analyzing step.

* * * * *